United States Patent
Papangelis et al.

(10) Patent No.: US 10,635,698 B2
(45) Date of Patent: Apr. 28, 2020

(54) DIALOGUE SYSTEM, A DIALOGUE METHOD AND A METHOD OF ADAPTING A DIALOGUE SYSTEM

(71) Applicant: Kabushiki Kaisha Toshiba, Minato-ku (JP)

(72) Inventors: Alexandros Papangelis, Cambridge (GB); Ioannis Stylianou, Cambridge (GB)

(73) Assignee: Kabushiki Kaisha Toshiba, Minato-ku (JP)

(*) Notice: Subject to any disclaimer, the term of this patent is extended or adjusted under 35 U.S.C. 154(b) by 240 days.

(21) Appl. No.: 15/687,782

(22) Filed: Aug. 28, 2017

(65) Prior Publication Data
US 2018/0232435 A1 Aug. 16, 2018

(30) Foreign Application Priority Data
Feb. 13, 2017 (GB) .................... 1702342.5

(51) Int. Cl.
*G06F 17/00* (2019.01)
*G06F 16/332* (2019.01)
(Continued)

(52) U.S. Cl.
CPC ........... *G06F 16/3329* (2019.01); *G06N 3/04* (2013.01); *G06N 3/08* (2013.01); *G06N 5/027* (2013.01);
(Continued)

(58) Field of Classification Search
CPC ..... G06F 16/3329; G06F 16/367; G06N 3/02; G06N 3/04; G06N 3/08; G06N 5/027;
(Continued)

(56) References Cited

U.S. PATENT DOCUMENTS 9,679,557 B2* 6/2017 Weilhammer ........ G10L 15/063
9,865,257 B2* 1/2018 Wang ...................... G10L 15/22
(Continued)

FOREIGN PATENT DOCUMENTS

GB 2537903 A 11/2016

OTHER PUBLICATIONS

Combined Search and Examination Report dated Oct. 4, 2017 in United Kingdom Patent Application No. GB 1702342.5.
(Continued)

*Primary Examiner* — Greta L Robinson
(74) *Attorney, Agent, or Firm* — Oblon, McClelland, Maier & Neustadt, L.L.P.

(57) ABSTRACT

A dialogue system including: an input receiving data relating to a speech or text signal originating from a user; and a processor configured to: update a system state based on the input data using a state tracker model, the system state including probability values associated with each of plural possible values for each of plural categories; identify one or more relevant categories based on at least part of the updated system state information using an identifier model; define a set of information from stored information including plural action functions and categories, excluding categories not identified as relevant; generate a reduced system state, including the probability values associated with one or more of the plural possible values for each relevant category; determine an action based on the reduced system state and the set of information using a policy model; output information specified by the determined action at an output.

17 Claims, 9 Drawing Sheets

(51) Int. Cl.
    *G10L 15/06*    (2013.01)
    *G06N 3/04*     (2006.01)
    *G06N 5/02*     (2006.01)
    *G06N 3/08*     (2006.01)
    *G10L 15/18*    (2013.01)
    *G06N 3/02*     (2006.01)
    *G06F 16/36*    (2019.01)
    *G10L 13/00*    (2006.01)
    *G10L 15/16*    (2006.01)
    *G06N 7/00*     (2006.01)

(52) U.S. Cl.
    CPC .......... *G10L 15/063* (2013.01); *G06F 16/367* (2019.01); *G06N 3/02* (2013.01); *G06N 7/005* (2013.01); *G10L 13/00* (2013.01); *G10L 15/16* (2013.01); *G10L 15/1815* (2013.01); *G10L 15/1822* (2013.01); *G10L 2015/0635* (2013.01)

(58) Field of Classification Search
    CPC ....... G06N 7/005; G10L 15/063; G10L 15/16; G10L 15/1815; G10L 15/1822; G10L 13/00; G10L 2015/0635
    See application file for complete search history.

(56) References Cited

U.S. PATENT DOCUMENTS

| | | | |
|---|---|---|---|
| 9,977,778 B1* | 5/2018 | Perez | G06F 17/279 |
| 10,276,170 B2* | 4/2019 | Gruber | G10L 17/22 |
| 2011/0010164 A1 | 1/2011 | Williams | |
| 2012/0053945 A1* | 3/2012 | Gupta | G10L 15/22 |
| | | | 704/256 |
| 2013/0275164 A1* | 10/2013 | Gruber | G10L 17/22 |
| | | | 705/5 |
| 2018/0121415 A1* | 5/2018 | Perez | G06F 17/279 |

OTHER PUBLICATIONS

Alexandros Papangelis, et al., "Muiti-domain Spoken Dialogue Systems using Domain-Independent Parameterisation", Domain Adaptation for Dialogue Agents workshop of the 26th European Conference on Machine Learning, 2016, 8 pages.

Zhuoran Wang, et al., "Learning Domain-Independent Dialogue Policies via Ontology Parameterisation", Association for Computational Linguistics, 2015, pp. 412-416.

Matthew Henderson, et al., "Word-Based Dialog State Tracking with Recurrent Neural Networks", SIGDIAL, 2014, 8 Pages.

* cited by examiner

DIALOGUE SYSTEM, A DIALOGUE METHOD AND A METHOD OF ADAPTING A DIALOGUE SYSTEM

CROSS-REFERENCE TO RELATED APPLICATIONS

This application is based upon and claims the benefit of priority from prior United Kingdom Application number 1702342.5 filed on Feb. 13, 2017, the entire contents of which are incorporated herein by reference.

FIELD

The present disclosure relates to a dialogue system, a dialogue method and a method of adapting a dialogue system.

BACKGROUND

Dialogue systems, for example spoken dialogue systems (SDSs) are used in many applications, including automated call centres, assistive technology, speech-driven interactive mobile applications, speech interface for wearable devices and human-robot interactions for example, and are intended to interact with humans, for example to verbally interact with humans.

Dialogue systems may use pre-defined domain-specific ontologies and a policy model trained to work in the specific pre-defined domain. Multi-domain dialogue systems may switch between pre-defined domain ontologies and corresponding dialogue policies, using topic trackers to identify the pre-defined domain that most closely matches the input.

There is a continuing need to make dialogue systems operable across multiple domains, whilst reducing the training, maintenance and human design input needed for such systems.

BRIEF DESCRIPTION OF THE DRAWINGS

Systems and methods in accordance with non-limiting arrangements will now be described with reference to the accompanying figures in which.

DETAILED DESCRIPTION

Figure 1A:
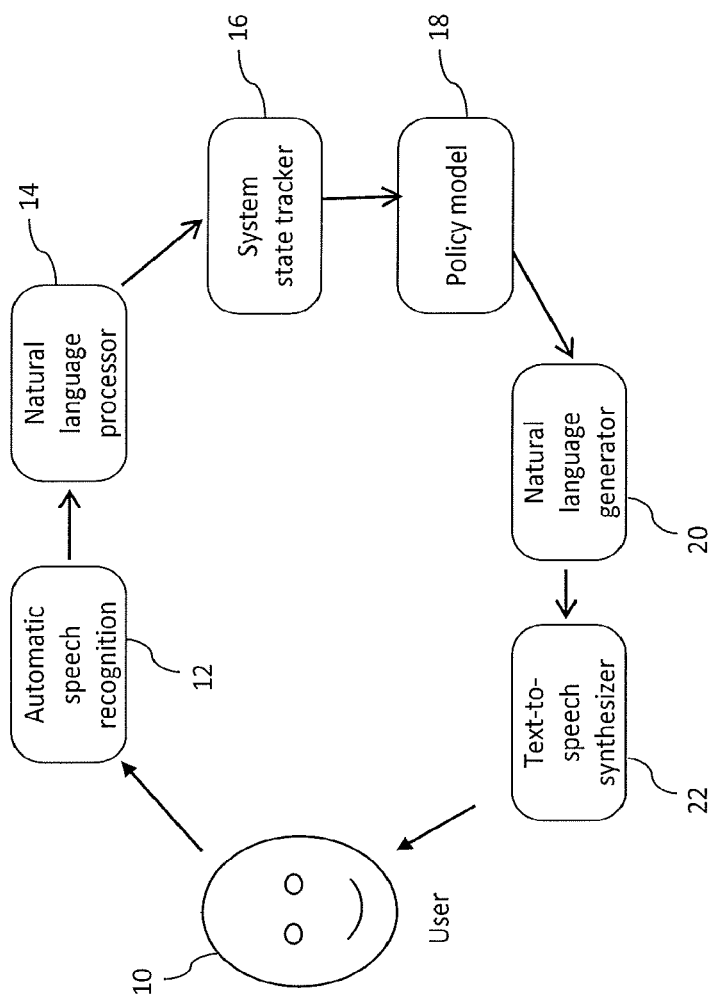
FIG. 1(a) is a schematic illustration of a spoken dialogue system.

A dialogue system is provided comprising:
an input for receiving data relating to a speech or text signal originating from a user;
an output for outputting information specified by an action; and
a processor configured to:
  i) update a system state based on the input data using a state tracker model, wherein the system state comprises probability values associated with each of a plurality of possible values for each of a plurality of categories, wherein a category corresponds to a subject that the speech or text signal may relate to and can take on one or more values from a set of values;
  ii) identify one or more relevant categories based on at least part of the updated system state information using an identifier model;
  iii) define a set of information from stored information, the stored information comprising a plurality of action functions and categories, the set of information excluding categories which were not identified as relevant;
  iv) generate a reduced system state, comprising the probability values associated with one or more of the plurality of possible values for each of the relevant categories;
  v) determine an action based on the reduced system state and the set of information using a policy model;
  vi) output information specified by the determined action at the output.

The stored information and the plurality of categories are from a plurality of different pre-defined domain-specific ontologies, wherein a pre-defined domain corresponds to a particular dialogue topic and wherein the pre-defined domain-specific ontology comprises the plurality of categories and actions relating to the particular dialogue topic, and wherein the relevant categories comprise categories from different pre-defined domain-specific ontologies and the set of information comprises actions from different pre-defined domain-specific ontologies.

The policy model may be configured to operate with ontology-independent parameters as input and step iv) may further comprise parameterizing the reduced system state in terms of a first set of one or more ontology independent parameters. Step iii) further comprises parameterizing the set of information in terms of a second set of one or more ontology independent parameters.

The first set and the second set may be the same or different. The first and/or second set of parameters may comprise one or more of potential impact when the slot has a value, a measure of slot importance, a measure of slot priority, descriptive characteristics of the slot or features describing the dialogue.

The importance value for each slot may be continually updated by determining a cumulative moving average of the ratio of a performance indicator achieved to the maximum possible performance indicator as an estimate of category importance. The performance indicator achieved may be estimated by the system or inputted by the user. The maximum performance indicator may be a stored value.

The priority value for each slot may be continually updated by determining a cumulative moving average of the relative position in the dialogue as an estimate of category priority, wherein the priority is used as one of the second set of parameters.

The action comprises and action function combined with an action function input. A list of actions may be generated from the set of stored information and inputted into the policy model. The action function input may be a relevant category or a null value for example.

The dialogue system may be a spoken dialogue system. The input may be configured to receive a speech signal and wherein step i) further comprises generating an automatic speech recognition hypothesis with associated probability from the input speech signal. The output may be configured to output a speech signal and wherein step vi) comprises generating text based on the action and converting the text to speech and outputting the speech signal at the output.

Step ii) may comprise inputting the at least part of the updated system state information into the identifier model, which obtains a probability that each category is relevant based on the updated system state and identifies the relevant categories as those with probabilities higher than a threshold value.

The inputted system state information may comprise the possible value corresponding to the highest probability for each category from the updated system state and the corresponding probability and does not include the other possible values and corresponding probabilities.

The updated system states for each new input signal in a dialogue may be stored for a period of time, and wherein step ii) comprises inputting the at least part of the updated system state information from one or more previous input signals into the identifier model. The input may comprise a concatenation of the system states for a number of previous turns defined by a fixed window size. Each system state may be multiplied by a forgetting factor, the size of which decreases for each turn in the window.

The categories may be slots. The system may be an information retrieval system.

Step i) may comprise updating a plurality of system states based on the input data using a plurality of state tracker models, wherein each system state comprises probability values associated with each of a plurality of possible values for each of a plurality of categories associated with a pre-defined domain.

There is also provided a dialogue method comprising:
   receiving data relating to a speech or text signal originating from a user;
   updating a system state based on the input data using a state tracker model, wherein the system state comprises probability values associated with each of a plurality of possible values for each of a plurality of categories, wherein a category corresponds to a subject that the speech or text signal may relate to and can take on one or more values from a set of values;
   identifying one or more relevant categories based on at least part of the updated system state information using an identifier model;
   defining a set of information from stored information, the stored information comprising a plurality of action functions and categories, the set of information excluding categories which were not identified as relevant;
   generating a reduced system state, comprising the probability values associated with one or more of the plurality of possible values for each of the relevant categories;
   determining an action based on the reduced system state and the set of information using a policy model;
   outputting information specified by the determined action at the output.

There is also provided a method of adapting a dialogue system, the method comprising:
   obtaining system states for a plurality of dialogues, each system state based on a speech or text signal in a dialogue, wherein the system state comprises probability values associated with each of a plurality of possible values for each of a plurality of categories, wherein a category corresponds to a subject that the speech or text signal may relate to and can take on one or more values from a set of values;
   training an identifier model to identify one or more relevant categories based on at least part of an input system state information.

The system states may be obtained from a corpus of data and the training performed using labels associated with the data which indicate a pre-defined domain corresponding to each utterance.

A policy model is also trained by repeatedly running through dialogues with a human or a simulated human and providing a performance indicator for each dialogue, wherein each dialogue comprises a sequence of text or speech signals and wherein the method further comprises:
   receiving data relating to a speech or text signal in a dialogue;
   updating a system state based on the input data using a state tracker model, wherein the system state comprises probability values associated with each of a plurality of possible values for each of a plurality of categories, wherein a category corresponds to a subject that the speech or text signal may relate to and can take on one or more values from a set of values;
   determining an action based on the system state and stored ontology information, the stored information comprising a plurality of action functions and categories,
   outputting information specified by the determined action at the output
   adapting the policy model to increase the performance indicator.

The policy model and identifier model can then be used in a dialogue system.

Alternatively, the identifier model and a policy model are trained together by using the identifier model and the policy model repeatedly to run through dialogues with a human or a simulated human and providing a performance indicator for each dialogue, and wherein the method further comprises:
   receiving data relating to a speech or text signal in a dialogue, wherein obtaining a system state comprises updating a system state based on the input data using a state tracker model,
   identifying one or more relevant categories based on at least part of the updated system state information using the identifier model;
   defining a set of information from stored information, the stored information comprising a plurality of action functions and categories, the set of information excluding categories which were not identified as relevant;
   generating a reduced system state, comprising the probability values associated with one or more of the plurality of possible values for each of the relevant categories;
   determining an action based on the reduced system state and the set of information using a policy model;
   outputting information specified by the determined action at the output;

adapting the policy model and the identifier model to increase the performance indicator.

The identifier model, the state tracker model and the policy model may be trained together and wherein the method further comprises adapting the state tracker model to increase the performance indicator.

The policy model may be configured to operate with ontology-independent parameters as input and step iv) may further comprise parameterizing the reduced system state in terms of a first set of one or more ontology independent parameters. Step iii) further comprises parameterizing the set of information in terms of a second set of one or more ontology independent parameters.

The first set and the second set may be the same or different. The first and/or second set of parameters may comprise one or more of potential impact when the slot has a value, a measure of slot importance, a measure of slot priority, descriptive characteristics of the slot or features describing the dialogue.

The importance value for each slot may be continually updated by determining a cumulative moving average of the ratio of a performance indicator achieved to the maximum possible performance indicator as an estimate of category importance. The performance indicator achieved may be estimated by the system or inputted by the user. The maximum performance indicator may be a stored value.

The priority value for each slot may be continually updated by determining a cumulative moving average of the relative position in the dialogue as an estimate of category priority, wherein the priority is used as one of the second set of parameters.

There is also provided a carrier medium comprising computer readable code configured to cause a computer to perform any of the above described methods.

Since some methods in accordance with embodiments can be implemented by software, some embodiments encompass computer code provided to a general purpose computer on any suitable carrier medium. The carrier medium can comprise a storage medium such as a floppy disk, a CD ROM, a magnetic device or a programmable memory device, or any transient medium such as any signal e.g. an electrical, optical or microwave signal. The carrier medium may comprise a non-transitory computer readable storage medium.

In many task-oriented spoken dialogue systems the ontology will specify a plurality of slots to be filled with one (or multiple) of a plurality of possible values. The policy is then configured to control the flow of the conversation to fill slots with a value in order to complete the task. For example, in a Partially Observable Markov Decision Process spoken dialogue system (POMDP-SDS), at each turn in a dialogue, a list of Automatic Speech Recognition (ASR) hypotheses with confidences scores (called an ASR n-best list) are observed, which may be parsed by a Spoken Language Understanding (SLU) unit to obtain an n-best list of semantic representations (dialogue acts). After this, a distributional representation of dialogue states (comprising user's goal and dialogue history), called a belief state, is maintained by a dialogue state tracking model which updates the belief at each turn of a dialogue based on the SLU outputs and the previous system action for example. The policy model 18 determines the next system action in semantic representation, which is then realised by a Natural Language Generation (NLG) module and is read to the user by a Text-to-speech (TTS) synthesiser. The policy model 18 and one or more other components may be connected neural networks, or may be replaced by a single neural network for example.

FIG. 1(a) is an overview of an example of such a SDS general architecture. Such spoken dialogue systems may comprise a number of components to, for example, convert speech from a human user 10 into text (automatic speech recognition 12), identify and collate semantic information (natural language processor 14), update a system state (system state tracker 16), generate an output action (policy model 18), generate the necessary text specified by the action (natural language generator 20) and synthesize speech (text to speech synthesizer 22). Alternatively, the policy model 18 and one or more other components may be replaced by a single neural network for example.

Figure 1B:
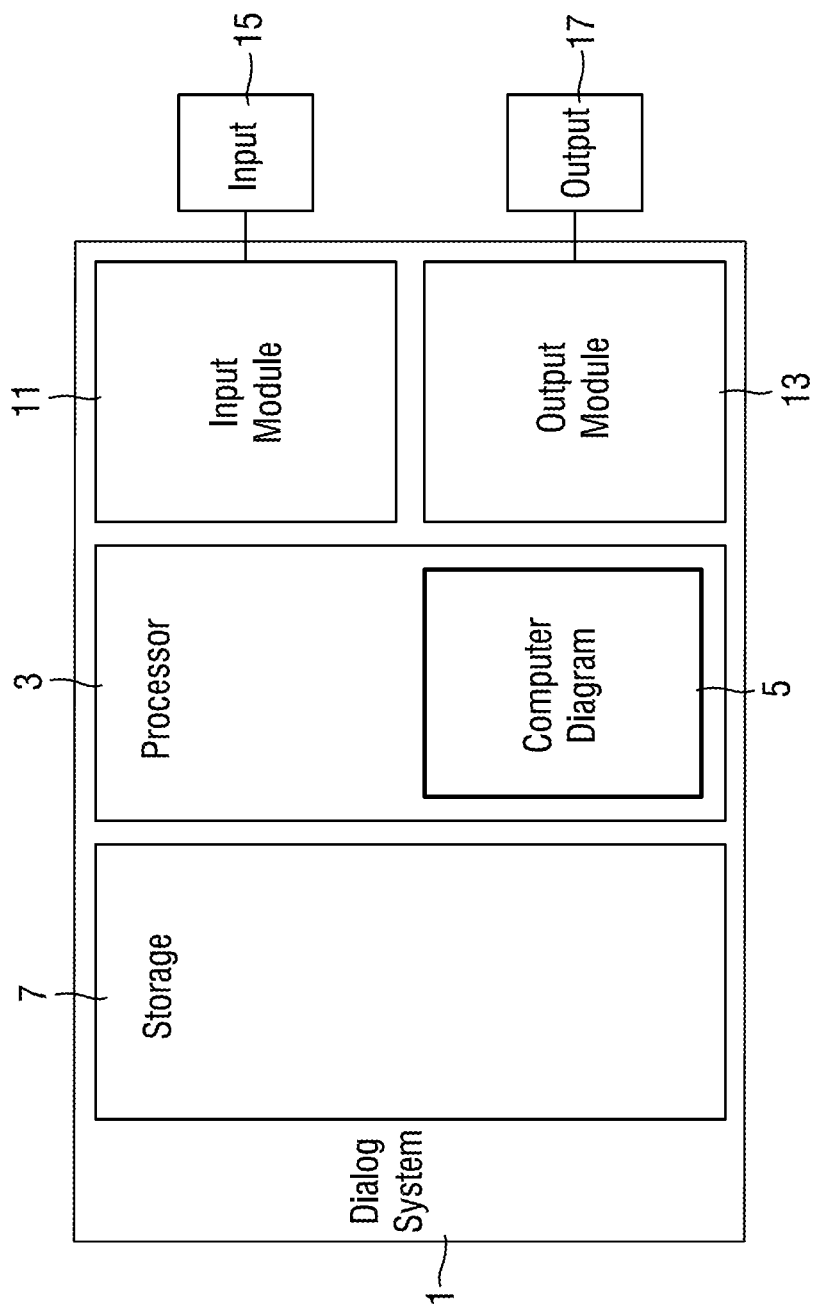
FIG. 1(b) is an overview of an example dialogue system architecture.

FIG. 1(b) is a schematic illustration of dialogue system 1. The dialogue system 1 may be an information retrieval dialogue system for example. The system 1 comprises a processor 3, and takes inputs which are representations of human utterance. This may be a semantic representation of a human utterance, or a collection of data representing information extracted from a human utterance. It may be speech or text signals. The system may also output a semantic representation, text or speech signals, or other output information, for example instructions to a device to perform a task such as an instruction for a phone to put through a call. The processor may be a dialogue manager and may implement a policy in order to determine the actions to be taken by the system 1.

A computer program 5 is stored in non-volatile memory. The non-volatile memory is accessed by the processor 3 and the stored computer program code is retrieved and executed by the processor 3. The storage 7 stores data that is used by the program 5.

The system 1 further comprises an input module 11. The input module 11 is connected to an input 15 for receiving data relating to a speech or text signal. The input 15 may be an interface that allows a user to directly input data, for example a microphone or a keyboard. Alternatively, the input 15 may be a receiver for receiving data from an external storage medium or a network. The representation may be received from a semantic decoder.

The system 1 may further comprise an output module 13. Connected to the output module 13 may be an output 17. The output 17 may be an interface that provides data to the user, for example a screen, headphones or a speaker. Alternatively, the output 17 may be a transmitter for transmitting data to an external storage medium or a network. Alternatively, the output 17 may provide instructions to another device or part of a device.

In use, the system 1 receives speech or text signals through the input 15. The program 5 is executed on processor 3 in the manner which will be described with reference to the following figures. It may output a text or speech signal at the output 17. The system 1 may be configured and adapted in the manner which will be described with reference to the following figures.

Figure 2:
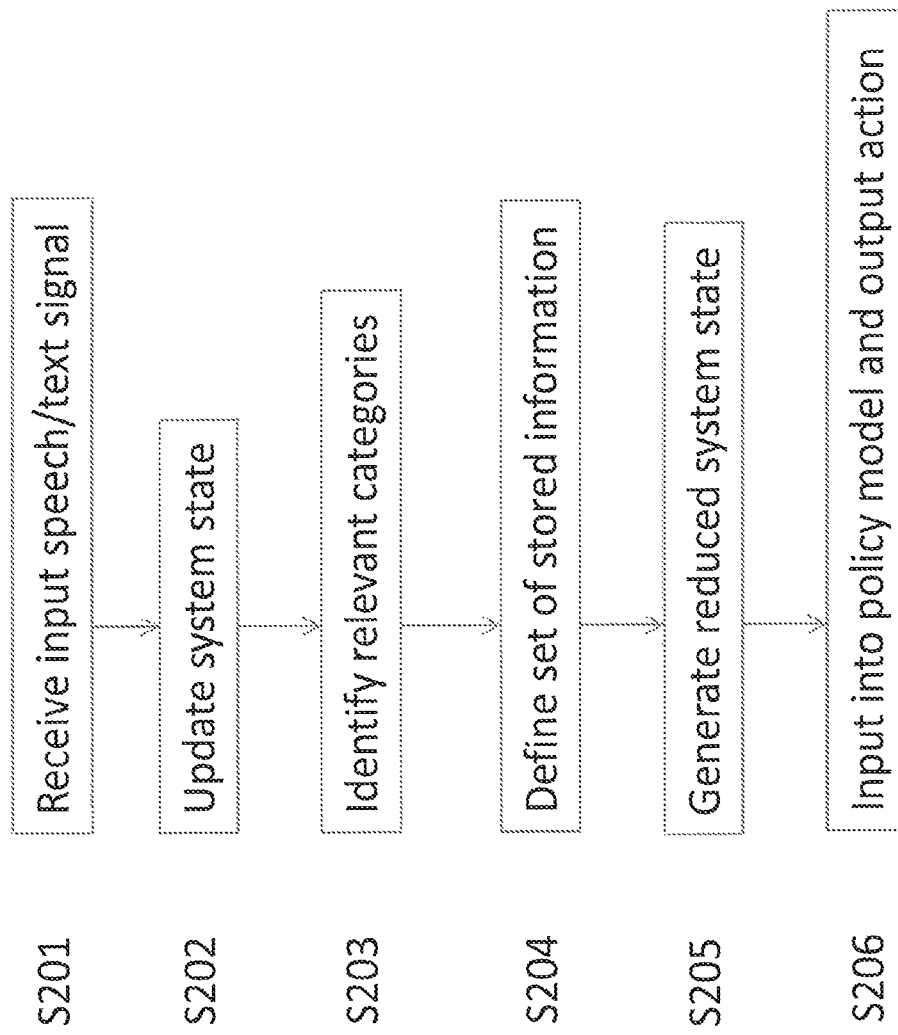
FIG. 2 is a flow chart showing an example method performed by the dialogue system.

FIG. 2 is a flow chart showing an example method performed by the dialogue system. The below will be described in relation to a spoken dialogue system, however it is to be understood that any dialogue system may be used, for example a text based dialogue system.

The system stores ontology information in the storage 7. The ontology information comprises action functions and categories. A category corresponds to a subject that the speech or text signal may relate to and can take on one or more values from a set of values. A category may be a slot in an information retrieval system for example.

Each category may correspond to one or more pre-defined domain-specific ontologies, so that the system stores ontology information from a plurality of different pre-defined domain-specific ontologies. A pre-defined domain corresponds to a particular dialogue topic. The pre-defined domain may be specific to the type and purpose of the dialogues, e.g. providing the user with a number of restaurants which match certain criteria, or identifying a suitable laptop for a buyer. A pre-defined domain may have a domain-specific ontology which comprises the types, properties and interrelationships of the entities specific to that domain. A pre-defined domain-specific ontology may comprise the plurality of categories relating to the particular dialogue topic.

The information from several pre-defined domain-specific ontologies is stored in the present system, and can be considered to be a single, multi-pre-defined-domain ontology. Thus the system stores ontology information comprising action functions, categories and the set of possible values corresponding to each category for each of a plurality of pre-defined domains $D_1$ to $D_N$. Here, N is used to represent the total number of pre-defined domains. Ontology information from one or more pre-defined domains can be added or removed at any stage.

For each dialogue turn, an identifier model identifies which slots are relevant for the dialogue system to progress. The system then defines "sub-domains" at each turn based on these slots, where the sub-domains are not pre-defined and comprise a part of the single, multi-pre-defined-domain ontology. The sub-domains contain the relevant ontology information for the dialogue turn, making it possible for policy training and system operation to be efficient.

In step S201, a representation of human utterance is received, e.g. an input speech or text signal. The utterance is part of a dialogue with a user.

If an input speech signal is received, the system may comprise an automatic speech recognition (ASR) module to generate a text signal from the input speech.

The system may further comprise a natural language processor module, which generates an n-best list of language understanding hypotheses with associated probabilities from an input text signal, or a text signal generated by an ASR module.

In S202, a system state is updated based on the input using a state tracker model. The system state may also be referred to as a dialogue state. The tracker model may be an intent recognition model. The text and associated confidence score generated in S201 are inputted into the tracker model, which outputs an updated system state. The state tracker model is a stored, trained model, configured to map input language understanding hypotheses to an updated system state.

The n-best list of hypotheses outputted from S201 (which may for example be only the hypothesis with the highest associated probability, or may be more than one hypothesis) is inputted into the state tracker model. The state tracker model derives probability distributions for slot values given the hypotheses, the probability distributions being derived using parameters which are stored in memory.

A system state comprises probability values associated with each of a plurality of possible values for each of a plurality of categories. The system state is updated by updating these values for one or more of the categories.

The categories may be slots, for example in a task-oriented spoken dialogue system. In such a system, the policy is in general configured to control the flow of the conversation to fill slots with a value in order to complete the task. Each slot is associated with two or more values, where a value is a possible valid response that the dialogue manager can recognise in relation to a slot. For example, in a pre-defined domain "restaurants", a slot may be "price" and possible values may be "low", "mid", and "high".

In some cases, a slot may have the possible values "provided" and "not provided". For example, for the case where the user is looking for a specific restaurant by name, the arbitrary restaurant name is saved in a variable and the slot takes two values: "restaurant name provided" and "restaurant name not provided". The variable is used to store the actual name of the restaurant. For example, initially, the variable will be empty and the slot will have the value "name not provided". If the user asks for 'Wok-wok restaurant' then the variable will store that name, and the slot will take the 'name provided' value. Only the slot and value is inputted into the policy model (in subsequent step S206) however, the actual restaurant name is simply stored as part of the system state. Once the action has been generated by the policy model (in subsequent step S206), the variable is added to the generated action e.g. inform(name='Wok-wok').

The state tracker model may be a POMDP based model, and the system state in this case is a belief state. The following example will be described for a system which uses a POMDP based belief state tracker model, however it is to be understood that other systems may be used, for example Markov decision process speech dialogue systems (MDP-SDS).

A belief state may comprise or represent some or all of the system's observations in the dialogue sequence, wherein an observation is an input to the system. As such, a belief state may track, comprise or be determined by all of the preceding inputs to the system made by a user in the dialogue sequence. A belief state therefore may provide a full dialogue history and context.

Thus in S202, for an input speech or text signal in the dialogue occurring at time t, a belief state is updated, giving $B_t(\hat{S})$. The belief state at time t, $B_t(\hat{S})$, comprises a vector $b_s$ of the beliefs with respect to each slot s. The belief with respect to a slot s may be the set of the probabilities that the slot has each possible value. For example, for the slot "price", the values and probabilities may be: [empty: 0.15, cheap: 0.35, moderate: 0.1, expensive: 0.4]. These probabilities are updated by the tracker model at each time slot t based on the new input utterance. The belief tracker model is a stored trained model that maps the input utterance to slot values, and updates the probabilities accordingly.

The belief state may also comprise slot independent beliefs, for example beliefs that relate to the dialogue history. It may also comprise joint beliefs, which are probability distributions over the values of more than one slot, e.g. price and location (the probability that the user said both "cheap restaurant" and "centre of town").

Optionally, a plurality of state tracker models are used in S202. As described above, the system stores ontology information from a plurality of different pre-defined domain-specific ontologies. The system may comprise a plurality of state tracker models, corresponding to a plurality of, or to each of, the pre-defined domains. Each state tracker model updates a pre-defined domain specific belief state, which comprises probability values associated with each of a plurality of possible values for each of a plurality of categories which are associated with the specific pre-defined domain. At time t, there is therefore generated a plurality of belief states, $B_{Dn,t}(\hat{S})$, where the index n is used to identify the pre-defined domain. If there is one tracker model for each domain, this stage will result in N belief states. Each belief state $B_{Dn,t}(\hat{S})$ is generated by a separate tracker model, which is trained prior to implementation for the specific pre-defined domain, i.e. it is trained using data relating to that pre-defined domain. The belief state $B_{Dn,t}(\hat{S})$ comprises a vector $b_s$ of the beliefs with respect to each slot s from the domain $D_n$.

A single combined belief state $B_t(\hat{S})$ is then formed from the plurality of belief states. The combined belief state comprises a vector $b_s$ of the beliefs with respect to each unique slot from all of the pre-defined domains. Only the unique slots are kept. In other words, since the pre-defined domains may have overlapping features (such as beliefs about location, price, etc.) each overlapping feature is only included once in the combined belief state. If a slot is present in many domain-specific belief states, then the slot with the highest probability may be selected and used for the combined belief state for example. If a slot hasn't been mentioned in the current turn, then the most recent probabilities are used for that slot.

This combined belief state is not specific to a particular pre-defined domain but contains the beliefs for all of the pre-defined domains. Thus in this case the step S202 comprises two steps: updating the belief state for each pre-defined domain and forming the combined belief state. The output of S202 for an input speech or text signal inputted at time t in the dialogue is a belief state $B_t(\hat{S})$ which comprises the beliefs with respect to each unique slot across the plurality of pre-defined domains. The plurality of pre-defined domains are then treated as a single domain ontology for step S203.

Alternatively, a single state tracker model is used. This state tracker model is trained prior to implementation on data relating to the multiple pre-defined domains. It outputs a single global belief state $B_t(\hat{S})$ at time t, which comprises the beliefs with respect to each unique slot across multiple pre-defined domains.

In S203, one or more relevant categories are identified based on at least part of the updated system state information using an identifier model. The identifier model is a stored trained model configured to identify at each dialogue turn which categories are relevant for the dialogue to progress. This allows creation of "sub-domains" (in subsequent step S204) on the fly that do not need to be pre-defined.

Optionally, the at least part of the updated system state is the top belief for each slot (e.g. expensive=0.4 for the slot "price"). The system state in this case is referred to as being "summarised", such that only the value having the highest probability for each category is included. This "summary" system state is then inputted into the identifier model and the other values for each category are not inputted into the identifier model. The summary system state thus comprises all of the categories across the multiple pre-defined domains, but only one value and its corresponding probability value for each slot.

Alternatively, further values or all of the possible values for each category may be inputted into the identifier model.

Step S203 thus comprises inputting the at least part of the updated system state information into the identifier model. The identifier model is configured to map input system states to category relevance, where the input system states may be summary system states as described above. The identifier thus outputs a relevance score for each unique slot among all the pre-defined domains. Optionally, a threshold score may be defined, such that slots having a relevance score greater than or equal to the threshold score are determined to be relevant.

Optionally, the updated system states for each new input signal in a dialogue are stored for a period of time. In other words, a dialogue history is stored. The previous system states for the entire dialogue may be stored, and may then be erased when the dialogue is terminated. Alternatively, one or more of the previous states in the dialogue are stored on a rolling basis. Step S203 may then comprise inputting the at least part of the updated system state information for one or more of the previous input signals into the identifier model. Optionally, the input is a concatenation of past belief states, multiplied by a forgetting factor. The forgetting factor may be a number between 0 and 1 for example.

Optionally, a window of size w can be defined, and the input to the identifier model generated as a concatenation of the past belief states:

$$B_{in} = B_t(\hat{S}) \oplus fB_{t-1}(\hat{S}) \oplus \ldots \oplus f^{w-1}B_{t-w-1}(\hat{S})$$

$\oplus$ stands for the operator to concatenate two vectors. The window w controls how far back the input goes. For example, w may be equal to 3. t is a discrete time index, where each time t corresponds to an input utterance. The forgetting factor means that more recent beliefs have a greater effect. Initially for each dialogue, the input buffer can be padded with zeros, when not enough past beliefs are available for the dialogue to fill the entire window. The input belief state "$B_{in}$" has w times the number of features of $B_t$.

In S203, the identifier model identifies the relevant categories for the current system state, from all of the unique categories in the stored ontology. The set of identified relevant categories may comprise categories from different pre-defined domain-specific ontologies. The output of S203 is a list of categories which have been identified as relevant.

The system stores information, comprising action functions and categories from a plurality of different pre-defined domain specific ontologies. In S204, the system defines a set of information from the stored information, the set of information excluding categories which were not identified as relevant. In other words, the set of information comprises a plurality of action functions and relevant categories. Thus the system has created a new sub-domain, comprising action functions and categories, where the categories may relate to different pre-defined-domain specific ontologies. The categories are those identified as relevant in S203.

The input to the policy model in subsequent step S206 comprises a set of actions. A full system action a can take one of the following forms: a( ) (e.g. reqmore( ), hello( ), thankyou( ), etc.); a(s) (e.g. request(food)); a(s=v) (e.g. confirm(area=north)); $a(s=v_1, s=v_2)$ (e.g. select (food=Chinese, food=Japanese)); and $a(s_1=v_1, s_2=v_2, \ldots, s_n=v_n)$ (e.g. offer(name="Peking Restaurant", food=Chinese, area=centre)). Here a is an action function, e.g. a communicative function such as "inform", that is domain-independent, and $s_x$ and $v_x$ denote slots and values respectively. Thus one or more of the full system actions comprises slot and may comprise value information as well as the domain independent action function.

The stored information may comprise a stored set of full actions. The information will comprise actions from multiple pre-defined domains. The full actions each comprise an action function (e.g. greet, inform, request, . . . ) and may also comprise one or more categories (e.g. price, location) or one or more categories and one or more values (e.g. price=high). The relevant categories are identified for the current turn in S203, and the set of full system actions relevant to those slots is defined in S204 (e.g. greet, inform_price, inform_location, request_price, request_location) and form the sub-domain information for the dialogue turn. The set of full system actions are defined by excluding those full actions which comprise category or category and value information for a category which is not one of the relevant categories identified in S203. The set of information defined in this step may comprise actions from different pre-defined-domain specific ontologies. For actions, which take two or more slots as input, e.g. $a(s=v_1;s=v_2)$ and $a(s_1=v_1,s_2=v_2, \ldots, s_n=v_n)$, only those for which all the input slots have been determined to be relevant are included in the set of information.

The set of the stored information defined in step S204 may comprise the full system actions comprising action functions a (domain-independent) combined with the relevant inputs identified in S203, as well as actions which comprise only action functions. The set of stored information may comprise a list of the relevant full actions.

Alternatively, the stored information comprises the actions functions separate from the categories and values. The relevant categories are identified for the current turn in S203, and the set of information defined in S204 by excluding the categories (and associated values) which were not identified as relevant. Thus the action functions are stored as separate from the relevant inputs (the relevant inputs being null or one or more categories and optionally one or more values). In this case, the full actions are formed from this stored set of information before being inputted into the policy model in subsequent step S206. The full actions are formed by simply combining the actions functions with the inputs in the set of information.

Optionally, instead of full system actions to the system uses so-called summary actions in S204. Summary actions may be defined by the following rules:

(1) if an action only takes one slot as its operand (e.g. confirm(area= . . . )), the actual value is eliminated and the action is summarised to a(s=<current/top value hypothesis in slot s>) (e.g. confirm(area=north)), such that only the top value for each slot is retained; and (2) if an action takes a list of slots as its operand, it is summarised as a(s1=<current/top/joint slot-value hypothesis in slot s1>, s2=<current/top value hypothesis in slot s2>, . . . ).

In other words, the current system state (if deterministic states are used, i.e. in MDP-SDS) or the top belief (if belief states are used, i.e. POMDP-SDS) hypothesis is substituted into the < > for each action. By using summary actions, the values can be removed from the action information that is inputted into the policy model in subsequent step S206, and only the action functions and categories are inputted to the policy model e.g. confirm(area). The output summary action from the policy model in S206 can then be converted back to the "full" action by substituting in the top value for that slot, e.g. confirm(area=north).

As detailed above, full system actions may have the following structure: commFunction(slot1=value1; . . . ; slotN=valueN), for example: require_more( ), confirm (food=Indian), select(area=south, area=east) or inform (area=north, food=Indian, price=cheap). These actions can be "summarized" by representing them as $a(s1=b^{top}_{s1}, s2=b^{top}_{s2}, \ldots)$, where $b_s$ denotes the marginal belief with respect to slot s, and $b^{top}_s$ is the top belief for state s. The value information is then not inputted into the policy model is subsequent step S206. Optionally, only summary actions with one slot (or no slots) may be used.

After this abstraction, summary actions can be defined as $a_s$ (for those actions depending on one or more slots s), which just comprise an action function a and the one or more slots (without values) and a (for those who do not have any arguments or take a joint hypothesis as its arguments, i.e. independent of any particular slot). Summary actions $a_s$ (actions depending on slot or slots s) depending on any slots which were not identified as relevant are not included in the sub-domain generated in S204.

As described above for the full action case, the set of stored information may comprise a list of the relevant summary actions, or the action functions may be stored as separate from the relevant inputs (category or categories). In the latter case the summary actions are then formed from this information before being inputted into the policy model in subsequent step S206.

The full system actions may be formed first and then summarised, or the summary action information may be directly defined in S204. In this case, the action functions a and the slots identified in S203 are included in the set of information defined in S204. Slots which are not identified as relevant in S203 are excluded. No values are included. As before, the set of stored information may comprise a list of the relevant summary actions, or the action functions may be stored separately to the relevant inputs (categories), in which case the summary actions are then formed from this information before being inputted into the policy model in subsequent step S206.

In S205, a reduced system state is generated. The reduced system state comprises the probability values associated with one or more of the plurality of possible values for each of the relevant categories identified in S203. The reduced system state does not comprise probability values associated with categories that were not identified as relevant in S203. Thus the system state is reduced, since it may comprise fewer categories, i.e. only the categories relevant for the dialogue turn are included. Optionally, the reduced system state comprises the possible value corresponding to the highest probability value only for each category. The reduced system state does not comprise probability values associated with any of the plurality of possible values for any of the categories which were not identified as relevant.

Joint beliefs may be included in the reduced belief state when all corresponding slots have been selected as relevant in S203.

In S206, an action is determined by inputting the reduced system state generated in S205 and the set of information defined in S204 into a policy model. The set of information comprises actions, formed of action functions and inputs. The inputs may be null or categories identified as relevant in S203 for example. Since the input system state comprises only the relevant categories and only the actions in the sub-domain are considered, the policy operation is efficient. The system may use a single multi-domain dialogue policy model.

The policy model is trained prior to implementation to output an action based on an input system state and stored sub-domain ontology information, the stored ontology information comprising a list of actions. The policy may do this by defining a probability distribution over which actions might be taken. In a POMDP system, the summary belief states are represented as slot-value pairs. The dialogue policy model is optimised prior to implementation by estimating the expected long-term reward for a system action a being executed at a belief state B, such that the action with maximum expected reward is then selected at each dialogue turn during implementation. Training of the policy model is described later.

The policy operates at the communication-function level, and returns the combination of slots and actions (that together define a summary action) that has the highest probability to lead to dialogue success for the input belief state B. The policy model may applies rules, for example a 'slot in focus' rule, which looks at the slot(s) mentioned in the last user input or system action, and from there determines which slot is in focus. For example if the system says 'do you need a cheap restaurant?' and the user replies 'yes', the slot in focus rule provides a way of determining which slot the 'yes' refers to.

When summary actions are used, the policy model selects a summary action in S206, and this can then be mapped back to the full system action space, by consulting the current belief state (and in some cases the domain ontology). Full system action is used here to refer to the actions with the values included, e.g. commFunction(slot1=value1; . . . ; slotN=valueN) as described above. In other words, one can uniquely map summary actions back to their full actions, by substituting the respective top hypotheses in the belief into the corresponding slots. Thus if the summary action "confirm(area)" is outputted from the policy model, this is converted to a full action by inputting the top belief for the slot "area" into the action, giving "confirm(area=north)".

In S206, information specified by the determined action is outputted at the output. This may be a text signal, or a speech signal generated from a text signal for example.

Figure 3:
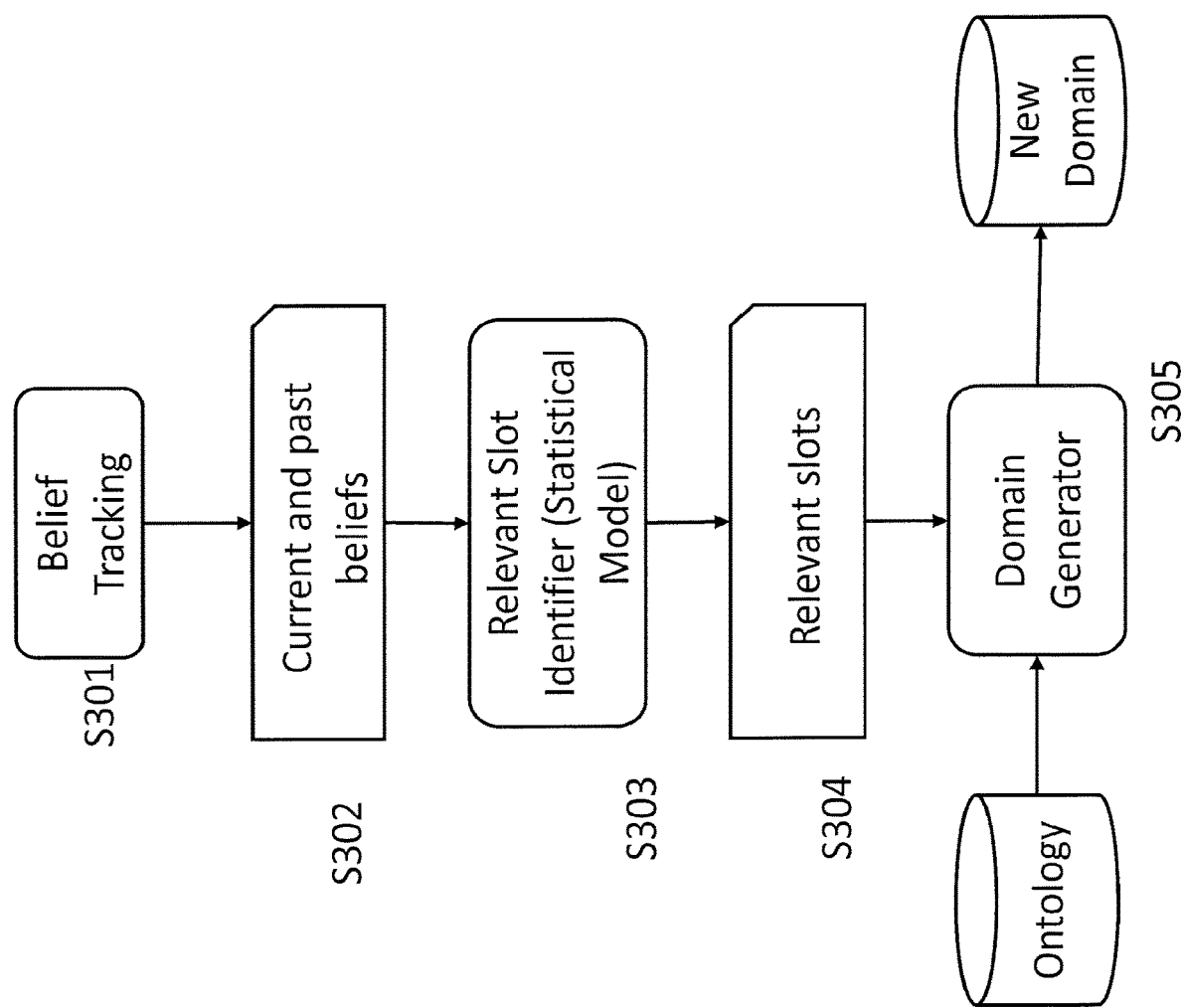
FIG. 3 is a flow chart showing an example method of sub-domain creation performed by the dialogue system.

FIG. 3 shows the sub-domain creation steps in more detail. In S301, belief state tracking is performed. This is an example of system state updating, and corresponds to S202 described above. In S302, the current and past belief states are extracted and these are input into the identifier model in S303. The model identifies the relevant slots and outputs these in S304. Steps S302 to S303 correspond to S203 described above. The relevant slots are then used to generate the sub-domain from the stored ontology (which comprises slots from multiple pre-defined domains and action functions) in S305. This corresponds to S204 in FIG. 2. A set of information is defined using the stored information, the set of information comprising action functions and relevant categories. This is output in S305 as a new sub-domain. This process is repeated for each dialogue turn, i.e. after the user's utterance.

Thus at every dialogue turn, the slot identifier model receives as input a belief state comprising the unique features across multiple pre-defined domains. A feature can for example be the distribution of values for a slot (e.g. price: [empty: 0.15, cheap: 0.35, moderate: 0.1, expensive: 0.4]). Only the top belief for each slot (e.g. price: [expensive: 0.4]) may be taken, in order to simplify.

The output of the slot identifier is a set of slots that are relevant to the current dialogue turn. These slots are used to create a sub-domain at run-time and use it for the current dialogue turn.

Optionally, the identifier model is a deep neural network (DNN). During training, the DNN learns to map the input belief states to relevant slots. Other classifiers/models trained differently can alternatively be used. Training of the identifier is described in further detail below.

Optionally, during implementation, the statistical identifier model does not learn (i.e. it does not update its internal weights) and only maps belief states to relevant slots. These slots are then used to generate a new sub-domain for the current dialogue turn. Alternatively, the identifier model may continue to update during implementation.

Figure 4:
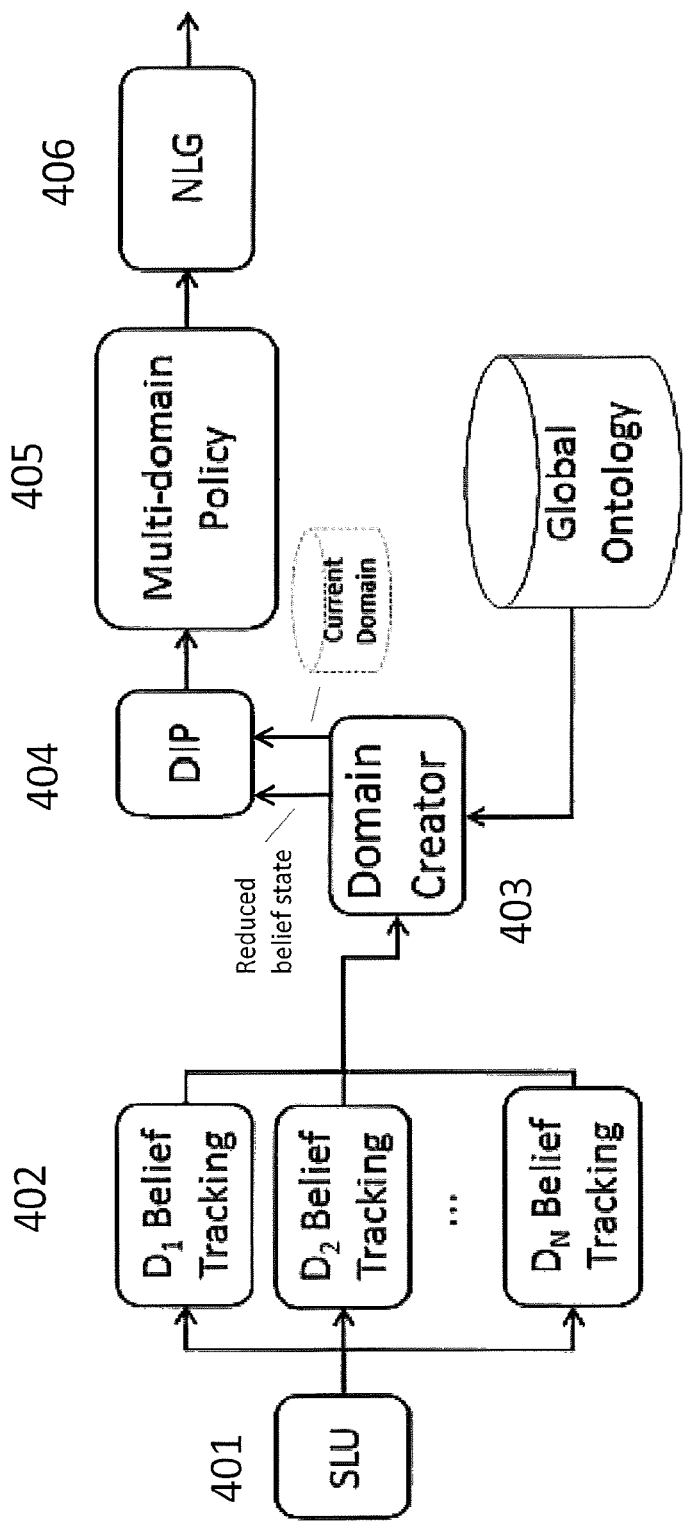
FIG. 4 shows a schematic illustration of an example architecture for a dialogue system.

FIG. 4 shows a schematic illustration of an example system architecture. In the system shown in FIG. 4, the policy model used is a domain independent policy model, and the reduced belief state and set of ontology information are parameterised before being inputted into the policy model. The policy model is domain independent, and thus may be trained with one of the pre-defined domains for example, but used with the sub-domains formed from all of the pre-defined domains in the system. As an alternative to such a policy model, a large policy model, trained on all of the pre-defined domains may be used.

In block 401, a spoken language unit (SLU) is used to convert input speech utterances into text. An n-best list of language understanding hypotheses may be generated in this step.

This is then inputted into multiple belief trackers in S402. Each belief tracker corresponds to a pre-defined domain $D_n$, where n goes from 1 to N. Belief states outputted from each belief tracker are then combined to give a single belief state, corresponding to all N pre-defined domains. This stage corresponds to step S202 in FIG. 2.

The belief state is inputted into the sub-domain creator 403. Not all of the belief state information may be used, for example, only the values corresponding to the highest probability for each slot may be inputted. The sub-domain creator 403 comprises a statistical identifier model which identifies relevant slots. The sub-domain creator 403 then defines the action information applicable to these relevant slots. This corresponds to S203 and S204 in FIG. 2. This information is shown in FIG. 4 as "current domain". The "current domain" information is defined using the global ontology information, which relates to a plurality of pre-defined domains, and is the information relating to the current sub-domain.

A reduced belief state, comprising the slots which were identified as relevant by the statistical model in the sub-domain creator 403, is then generated. This corresponds to S205 in FIG. 2.

The reduced system state is parameterised by a domain independent parameterisation (DIP) module 404 before being input into the policy model. The selected set of ontology information is also parameterised by the DIP module 404.

DIP is described in further detail below. In this case, the policy model is configured to operate with a parameterised system state input and a parameterised ontology.

Where DIP is used, S205 further comprises parameterizing the reduced system state in terms of ontology independent parameters and S204 further comprises parameterising the set of information in terms of ontology independent parameters. By ontology independent parameters, it is meant parameters which are not dependent on any information relating to any pre-defined domain. These could be e.g. information about whether the user has been greeted, or whether an item has been offered to the user (in general, regardless of domain). Further examples of the domain independent parameters will be described below. Both the reduced system state and the defined set of stored information may be parameterised at each dialogue turn. The parameterisation is performed according to one or more stored conversion functions, such that once the reduced belief state and the sub-domain of ontology information have been generated, they are then converted into domain independent parameters using the functions.

Optionally, one or more of the parameter values are stored in memory, and therefore some of the parameter values for the ontology information and belief state information do not need to be generated for each dialogue turn. For example, information which does not change with the dialogue progress, such as the number of items in the database that match a specific slot value (e.g. how many expensive restaurants are there) may be stored associated with the particular slot.

Parameterising the system state comprises defining each slot in terms of parameters, which may include converting a slot into ontology-independent parameters and representing a slot in terms of ontology independent parameters. In this step, an appropriate value for a parameter for a specific slot in the belief state is determined, and this may be used as an input, or as part of an input, for the policy model. The belief state-action space is mapped into a feature space that is independent of any domain information. Thus instead of belief states, the policy is configured to receive and operate with a single, or a plurality of ontology-independent parameters.

Parameterising the set of ontology information defined in S204 also comprises defining each slot in terms of parameters, which may include converting a slot into ontology-independent parameters and representing a slot in terms of ontology independent parameters.

The policy model used is domain independent. As such, the policy is able to effectively work with a plurality of different domains with different ontologies, and in particular with each new sub-domain generated for each input utterance. A state parameteriser 404 operates between the domain creator and the policy model. The state parameteriser 404 defines the reduced system states generated in S205 in terms of ontology-independent parameters such that they can be used as inputs for, or be operated on by, the policy model. An ontology parameteriser also effectively operates between the domain creator and the domain-independent policy model. The ontology parameteriser defines the set of information, comprising the action information, defined in S204 in terms of ontology independent parameters by defining the slots in terms of ontology-independent parameters. Definitions of the ontology independent parameters and functions for defining the slots in terms of the parameters may be stored in the system.

With the parameteriser 404 effectively translating the slots of the sub-domain ontology into domain-independent parameters before inputting them into the policy 405, and translating the slots of the system state into domain independent parameters, the policy no longer needs to be domain-dependent. As the policy 405 uses domain-independent parameters as inputs, rather than the ontology-specific slots, the policy 405 is domain independent. This means that the same policy 405 can be used with a plurality of different ontologies. As such, a policy does not need to be optimised specifically for a single pre-defined domain ontology. In other words, a policy optimised for a first ontology can be used with a second ontology, rather than having to optimise a policy specifically for the second ontology.

The parameters and functions used to convert the slots into parameters will now be described.

The ontology-independent parameters may be numerical parameters. A parameter may be a number, vector or distribution. The ontology-independent parameters may be a series, string or matrix of numbers representing certain ontology-independent parameters. An ontology-independent parameter may comprise a definition or equation. Where a parameter is said to be determined by an entity, the entity may be used as an operand to determine a parameter-quantity for inputting into the parameterised policy as an input. It is to be understood that where a parameter is said to be determined by an entity, the entity may not be the only operand or influencing factor in determining the parameter. As such, 'determined by' does not necessarily mean solely determined by. Where it is said that a parameter is determined by an entity, the parameter may be dependent on, proportional to, inversely proportional to or otherwise related to the entity.

A slot or belief state defined in terms of parameters may comprise a parameter-quantity or a plurality of parameter-quantities. For example, a parameter may be determined by the number of possible values a slot can take, M. The parameter may be an equation using M as an operand. When applied to a slot, M will be used to produce a value; this value may be a parameter-quantity, which may be a number, vector or distribution. The parameterised policy may be configured to operate with a parameter-quantity as its input.

The ontology-independent parameters may be defined to allow slots of one ontology to effectively be compared to slots of a different ontology, via an ontology-independent space. The ontology-independent parameters may be properties of a slot which can be measured, calculated, determined or estimated for a plurality of different slots belonging to a plurality of different ontologies.

A policy configured to operate with ontology-independent parameters may be able to define the behaviour of a SDS based on inputs which are not specific or dependent on the ontology with which it is working. A parameterised policy may be a policy configured to operate on parameters. A parameterised policy may be configured to receive representations of slots and/or belief states, defined in terms of parameters, as inputs. As such, a specific parameter-value may be determined for an, or each, parameter (and optionally for each slot) and the parameterised policy may be configured to operate with these specific parameter-values.

It is to be understood that while a parameterised policy is configured to operate with an ontology-independent parameter as an input, the parameterised policy may be configured to operate with a plurality of parameters as inputs. A slot of an ontology or a belief state may be defined in terms of a plurality of ontology-independent parameters, respectively.

Using such parameters allows a fixed-size domain-independent space, and policies learned on this space can be used for any domain, and in particular for the sub-domains generated for each input utterance. Thus the system uses the same single policy for each sub-domain generated at each turn in the dialogue. The policy model effectively solves generic information-seeking problems. This means, for example, that instead of taking an action "inform(food)" the policy model takes and outputs actions of the type "inform (slot), for slot with maximum belief and importance greater than X" (where the importance will be described later and is a measure of how likely it is that a slot of the end user ontology must be filled for the parameterised policy to meet a user's requirement). The system has access to the respective ontologies for each sub-domain, allowing it to map its output actions from the domain-independent space back to each domain-specific space.

The parameters may be general characteristics of slots in information-seeking dialogues, for example one or more of:
potential impact on the search results when the slot has a value (for example, if in the database DB there are 33% cheap restaurants, 33% moderately priced and 33% expensive ones, and the slot 'price' has a particular value (e.g. cheap), then effectively the number of relevant items is reduced by ⅔. Other values, e.g. location or food type may have lesser discriminative power. This may influence which slot's value to request sooner in the dialogue for example);
importance: a measure of how likely it is that the slot of the end user ontology must be filled for the parameterised policy to meet a user's requirement, wherein the processor may be configured to determine this importance, or it may be defined by a user during training and learned, and it may be continuous or binary (optional or required);

priority: a measure of the users perceived potential impact on the search results, wherein the processor may be configured to determine this priority, or it may be defined by a user during training and learned, and may be continuous or binary;

descriptive characteristics (e.g. number of allowable values, distribution of those values in the database (DB));

features describing the dialogue (for example the last user act).

For example, an ontology-independent parameter may be determined by the likely position in a dialogue at which the slot will be requested or referenced by a user. An ontology-independent parameter may be proportional to, or inversely proportional to, the entropy of the value distribution for the respective slot. The entropy of the value distribution for the respective slot may be assigned to one of a plural of entropy-range bins to determine the ontology-independent parameter. An ontology-independent parameter may be determined by or related to how each slot is related to completing the underlying task. The data by which an ontology-independent parameter is determined may be the proportion of the values for the slot which, if selected, would result in the number of results being equal to or below a threshold number.

Some further more specific examples of ontology independent parameters are described below, where $V_s$ denotes the set of the values that a slot s can take, and $|V_s|$ is the size of $V_s$. $h=(s_1=v_1 \wedge s_2=v_2 \ldots s_n=v_n)$ is a user goal hypothesis consisting of a set of slot-value pairs. DB(h) denotes the set of candidates in the stored database (DB) satisfying h. The database DB comprises items (such as restaurants). These are the candidates. The candidate may be e.g. an Indian restaurant, with a name, address, food type, phone number etc. DB is thus a database in which the columns represent the slots and the rows are specific items with specific slot values. In addition, $\lfloor x \rfloor$ is defined as the largest integer less than and equal to x.

One or more of the following quantities can be used for parameterisation:

Number of values
- e.g. a continuous parameter, $1/|V_s|$ (where the normalised quantity may be used to make all the parameters have similar value ranges for numerical stability purposes);
- e.g. discrete parameters mapping $|V_s|$ into N bins, indexed by $\min\{\lfloor \log_2|V_s| \rfloor, N\}$, for example allocating one of six binary-bins according to $\min\{int[\log_2(|V_s|)], 6\}$, so that a slot where $|V_s|=8$ would be allocated the following parameter: [0,0,1,0,0,0], where "int" refers to a function which finds the nearest integer. This groups slots into categories/bins according to the number of values they can take;

Importance e.g. two parameters describing, respectively, how likely a slot will and will not occur in a dialogue:
- e.g. a binary indication of whether the slot must be filled in order to complete the task or satisfactorily meet the user's criteria (0=no, 1=yes);
- e.g. a continuous measure of how likely it is that the slot of the end user ontology must be filled for the parameterised policy to meet a user's requirement, wherein the processor may be configured to determine this importance;

Priority
- e.g. three parameters denoting, respectively, how likely a slot will be the first, the second, and a later attribute to address in a dialogue, e.g. as a scale of {1,2,3} mapped to {[1,0,0],[0,1,0],[0,0,1]};
- e.g. a continuous measure of the user's perceived potential impact on the search results, wherein the processor may be configured to determine this priority;

Value distribution in DB:
- e.g. where DB(s=v) denotes the set of entities in the database that have the attribute s=v, and |DB(s=v)| and |DB| denotes the size of the above set and the size of the database respectively, the value distribution may be calculated by calculating |DB(s=v)|/|DB| for each possible value v of the slot s to produce a discrete distribution (a normalised histogram), and then the entropy may be computed for this normalised histogram;

Potential contribution to DB search, e.g. given the current top user goal hypothesis h* and a pre-defined threshold τ,
- How likely filling s will reduce the number of matching DB results to below τ, i.e. $|\{v:v \in V_s, |DB(h^* \wedge s=v)| \leq \tau\}|/|V_s|$ (proportion of the slot's values resulting in obtained results in the database below a threshold number);
- How likely filling s will not reduce the number of matching DB records to below τ, i.e. $|\{v:v \in V_s, |DB(h^* \wedge s=v)| > \tau\}|/|V_s|$ (proportion of the slot's values resulting in obtained results in the database above a threshold number)
- How likely filling s will result in no matching records found in the DB, i.e. $|\{v:v \in V_s, DB(h^* \wedge s=v)=\emptyset\}|/|V_s|$ (proportion of the slot's values resulting in obtained results in no results in the database meeting the user's criteria);
- note that this parameter will only be non-zero for slots whose current top hypothesis in the belief is null, in other words, when the system believes it hasn't observed any constraints for those slots yet.

The policy may be configured to receive a plurality of ontology-independent parameters for each slot or belief state. As such, a slot or belief state may be defined in terms of a plurality of ontology-independent parameters. A slot or belief state may be defined in terms of 5, 10 or more than 10 ontology-independent parameters. A slot or belief state may be defined in terms of all of the above ontology-independent parameters.

There may be a first set of ontology-independent parameters for defining a slot of the sub-domain ontology, i.e. the set of information defined in S204, and a second set of ontology-independent parameters for defining the reduced system state. The first set may be different to the second set or the same. The first and second set may be mutually exclusive.

In particular, the parameterisation of the reduced system state may be described by the function $\psi(b,s)$, which will be described in more detail below.

An ontology-independent parameter for defining a system state may be determined by the maximum probability in the system state (i.e. the probability corresponding to the top hypothesis). An ontology-independent parameter for defining a system state may be determined by the entropy of the distribution. An ontology-independent parameter for defining a system state may be determined by the probability difference between the top two hypotheses (in an example implementation this value may be discretised into 5 bins with interval size 0.2). An ontology-independent parameter for defining a system state may be determined by a non-zero rate, e.g. proportion of the elements in the system state that have non-zero probabilities.

A specific example for parameterising a belief state in a POMDP based system is described below.

A belief state is generally domain-dependent, i.e. the belief state generated in S205 comprises a marginal (i.e. slot-wise) belief for each relevant slot for the sub-domain (it may also comprise other domain independent information e.g. dialogue history). As described previously, a full belief state b can be represented in three parts: the joint belief $b_{joint}$, a set of slot-wise beliefs $\{b_s\}$ and other beliefs $b_o$ that are for domain-independent factors, such as dialogue history, communication methods, etc. Each b here is a discrete distribution (a non-negative normalised vector). In addition, there may be a set of (one-dimensional) values, each indicating the probability of a slot being requested by a user (e.g. if a user "how much is this laptop?", then the slot "price" is being requested). $br_s$ denotes the belief probabilities for slot s being requested.

$b_o$ is domain-independent and thus is not parameterised in this step.

Given a discrete distribution $\tilde{b}$, regardless of its dimension, a few general ontology-independent parameters can be used to define it. These parameters are applicable to any discrete distributions. The following are example parameters:

(1) The maximum probability in $\tilde{b}$ (i.e. the probability corresponding to the top hypothesis)

(2) The entropy of the distribution (3) The probability difference between the top two hypotheses (in one implementation this value was discretised into 5 bins with interval size 0.2)

(4) Non-zero rate: proportion of the elements in $\tilde{b}$ that have non-zero probabilities The system state parameterising step applies one or more of the above list (1) to (4) of parameterisations to $b_{joint}$, providing a domain-independent parameter vector for the joint belief.

The other domain-dependent components are $b_s$ (and $br_s$). If, when deciding whether to execute an action a, the system only needs to consider the slot s that a depends on (s can be uniquely derived from a) together with the global parameters (the joint belief parameters and other parameters above), and regardless of what is the case for the other slots, then every a will only have the dependence on its uniquely corresponding $b_s$ (and $br_s$). One or more of the above parameterisations (1) to (4) can then be applied to $b_s$ ($br_s$ is just a number, so that number can simply be used as an additional parameter without being parameterised).

The obtained parameters can then be concatenated to the joint belief parameters and the "other" parameters, such that the overall belief state parameterisation is ontology-independent. A belief state parameteriser undertakes the above steps to provide a parameter definition of the belief state. This can be used an input for the policy 405. This parameter definition of the belief state is updated every time the dialogue state tracker updates the belief state. Some of the parameters may be stored however.

The "other" parameters that may be included, may include one or more of:

(1) Belief probabilities for four communication methods, "byconstraint", "byname", "byalternatives", "finished"; and (2) Merged confidence scores for the user communication functions observed in the current turn.

For example, for each informable slot s, $\psi(b,s)$ extracts the probability of the top marginal hypothesis $b_s^{top}$, the entropy of $b_s$, the probability difference between the top two marginal hypotheses (discretised into 5 bins with interval size 0.2) and the non-zero rate ($|\{v:v \in V_s, b_s(v)>0\}|/|V_s|$). In addition, if the slot is requestable, the probability of it being requested by the user is used as an extra parameter. A similar parameterisation procedure (except the "requested" probability) is applied to the joint belief as well, from which the obtained parameters are used for all communication functions. To capture the nature of the underlying task (DB search), two additional parameters are defined for the joint belief, an indicator $[|DB(b_{joint}^{top})| \leq \tau]$ and a real-valued parameter $|DB(b_{joint}^{top})|/\tau$ if the former is false, where T is the same pre-defined threshold used for slot parameterisation as introduced above. The function $\psi(b,s)$ is used to parameterise the system state during training and implementation.

Optionally, there may be a different iv functions for different action functions, since different aspects of the belief may be important for different types of actions. For example, the input belief state may be parameterised using a plurality of different parameterisation functions, each corresponding to a different action function. The Q values for each action comprising the particular action function are generated for the belief state parameterised with the parameterisation function corresponding to the action, as described below. The action corresponding to the highest Q value is then selected. There are also a number of slot-independent parameters applied to all action types, including the belief over the communication methods and the marginal confidence scores of user dialogue act types (communication functions) in the current turn.

Optionally, since some of the parameters may relate to the full probability distributions, the parameterising is performed on the full belief state.

Unlike methods employed in a belief summariser, the belief parameteriser defines the belief state in terms of ontology-independent parameters. A belief parameteriser may also convert the full belief state into a low dimensional form however, thus reducing the number of dimensions from the full belief state. The output of the belief parameteriser is ontology and domain independent. The belief state, defined in terms of ontology-independent parameters can then be used as an input for the policy 405.

An ontology parameteriser defines the slots of the sub-domain ontology identified in S204 in terms of domain-independent parameters. This may be done separately to the conversion of the system state. These domain-independent parameters are not specific to the ontology and so can be used with multiple ontologies, and therefore sub-domains. The ontology information may be parameterised at each turn in the dialogue, or alternatively some or all of the parameters may be stored.

The ontology information comprises actions. As has been described above, actions in an SDS system may comprise two parts, a communication function a (e.g. inform, deny, confirm, etc.) and (optionally) a list of slot-value pairs s, v (e.g. food=Chinese, pricerange=expensive, etc.). Summary actions have been described above and simplify the semantic representations that form the master action a, and can be mapped back to the master action based on some pre-defined rules.

The master action a can thus be re-written as $a_s$, where s denotes the slot that a depends on when summarised. Here, s is fully derived from a and can be null (when the summary action of a is just a). Without losing generality, one can assume that the action functions a are domain-independent. The slots s are domain-specific (defined by the ontology), thus the summary action $a_s$ will be domain-dependent.

Each summary action $a_s$ can be parameterised in a domain-general way as:

$$a\varphi_\alpha(s)$$

Example functions $\varphi_\alpha(s)$ for parameterising the stored ontology slots are described below. As for the belief state, a different function $\varphi_\alpha(s)$ may be used for each action function a.

A large number of ontology-independent parameters can be used to define the slots of the ontology, of which the following are examples:

Number of values
- e.g. a continuous parameter, $1/|V_s|$ (where the normalised quantity may be used to make all the parameters have similar value ranges for numerical stability purposes);
- e.g. discrete parameters mapping $|V_s|$ into N bins, indexed by $\min\{\lfloor \log_2|V_s|\rfloor, N\}$, for example allocating one of six binary-bins according to $\min\{\text{int}[\log_2(|V_s|)], 6\}$, so that a slot where $|V_s|=8$ would be allocated the following parameter: [0,0,1,0,0,0];

Importance e.g. two parameters describing, respectively, how likely a slot will and will not occur in a dialogue:
- e.g. a binary indication of whether the slot must be filled in order to complete the task or satisfactorily meet the user's criteria (0=no, 1=yes);
- e.g. a continuous measure of how likely it is that the slot of the end user ontology must be filled for the parameterised policy to meet a user's requirement, wherein the processor may be configured to determine this importance;

Priority
- e.g. three parameters denoting, respectively, how likely a slot will be the first, the second, and a later attribute to address in a dialogue, e.g. as a scale of $\{1,2,3\}$ mapped to $\{[1,0,0],[0,1,0],[0,0,1]\}$;
- e.g. a continuous measure of the user's perceived potential impact on the search results, wherein the processor may be configured to determine this priority;

Value distribution in DB:
- e.g. where DB(s=v) denotes the set of entities in the database that have the attribute s=v, and |DB(s=v)| and |DB| denotes the size of the above set and the size of the database respectively, the value distribution may be calculated by calculating |DB(s=v)|/|DB| for each possible value v of the slot s to produce a discrete distribution (a normalised histogram), and then the entropy may be computed for this normalised histogram;

Potential contribution to DB search, e.g. given the current top user goal hypothesis h* and a pre-defined threshold $\tau$,
- How likely filling s will reduce the number of matching DB results to below $\tau$, i.e. $|\{v:v\in|DB(h^*\wedge s=v)|\leq \tau\}|/|V_s|$ (proportion of the slot's values resulting in obtained results in the database below a threshold number);
- How likely filling s will not reduce the number of matching DB records to below $\tau$, i.e. $|\{v:v\in V_s, |DB(h^*\wedge s=v)|>\tau\}|/|V_s|$ (proportion of the slot's values resulting in obtained results in the database above a threshold number)
- How likely filling s will result in no matching records found in the DB, i.e. $|\{v:v\in V_s, DB(h^*\wedge s=v)=\emptyset\}|/|V_s|$ (proportion of the slot's values resulting in obtained results in no results in the database meeting the user's criteria);
  note that this parameter will only be non-zero for slots whose current top hypothesis in the belief is null, in other words, when the system believes it hasn't observed any constraints for those slots yet.

Any one, more than one, or none of the above parameters may be used for example.

For example, if the underlying task is to obtain user's constraint on each slot so that the system can conduct a database (DB) search to find suitable candidates (e.g. venues, products, etc.), then the slot parameters may describe the potentiality of the slot to refine the search results (reduce the number of suitable candidates) if this slot is filled. For another example, if the task is to gather necessary and optional information to execute a system command (e.g. setting a reminder or planning a route), where the number of values of each slot can be unbounded, then the slots parameters may indicate whether the slot is required or optional. In addition, the slots may have some specific characteristics causing people to address them differently in a dialogue. For example, when buying a laptop, it is more likely one would talk about the price first than the battery rating. Therefore, parameters describing the priority of each slot are also necessary to yield natural dialogues. An exemplar list of parameters is provided above.

A method for parameterising the sub-domain of ontology information may be as follows. A slot of an ontology which is to be made ontology-independent is defined in terms of ontology-independent parameters. This may comprise calculating the above-listed parameters for the slot in question. The ontology-independent parameters may be according to the above list, or may be other ontology-independent parameters. In this way, every slot of the ontology is defined in ontology-independent parameters. Some of the slots are defined in terms of the ontology-independent parameters by calculating a value, as described in the above list of parameters.

The importance and priority parameters described in the above may be manually assigned binary values during training by the user for example.

Alternatively, one or both may be automatically estimated, for example from in-domain human-human example dialogues (e.g. collected from Wizard-of-Oz experiments). The importance and priority values can be learned during the training stage, and may also be updated during implementation. Alternatively, they may be directly learned during implementation.

Thus the importance and/or the priority may be determined for the slots of the ontology information for each sub-domain as follows.

For each slot that was mentioned by the user in the dialogue (and that has a value), the cumulative moving average of the ratio of the reward that was achieved to the maximum possible reward is determined as an estimate of slot importance. Thus for each category, a cumulative moving average of the ratio of the performance indicator achieved to the maximum possible performance indicator is determined as an estimate of category importance.

For the same slots, slot priority is determined by calculating a cumulative moving average of the relative position in the dialogue episode (i.e. turn number) when the slot was mentioned by the user.

When learning or updating the values during implementation, the system is able to adapt to potential changes as time progresses.

Specifically, the features are estimated as follows:

$$i'_s = \frac{r_t + |R_{min}|}{|R_{max}| + |R_{min}|}$$

$$I_s \leftarrow \frac{i'_s + (N-1)I_s}{N}$$

$$P_s \leftarrow \frac{pos'_s + (N-1)P_s}{N}$$

Where $I_s$ and $P_s$ are the estimates of importance and priority for slot s, respectively, $r_t$ is the reward at dialogue t, $R_{max}=\max\{R(s, a)\}$, $R_{min}=\min\{R(s, a)\}$, N is the number of times that P or I have been updated, and $pos'_s$ is the turn number at which slot s was mentioned by the user in dialogue t. Although elsewhere, t has been used to refer to a turn in a dialogue, in the above expressions it is used to refer to a particular dialogue. N in the above expressions refers to the total number of times importance of a slot (or priority) has been updated over multiple dialogues. The R values are determined by a reward function, which may be manually defined. The reward function may be the reward function used to train the policy model. This function provides a reward $r_t$ for the dialogue t. $R_{min}$ and $R_{max}$ are the minimum/maximum possible values that function R can assign. The maximum and minimum values can be determined through the reward function or the human rating. For example, the reward function may assign a value of 100 for success. This is then the maximum value, with 0 as the minimum value. Alternatively, humans may be asked to rate the dialogue on a scale 0-5, so that 5 is the maximum and 0 the minimum.

The reduced system state and set of information is then inputted into the policy model 405, which outputs a parameterised action.

Where a DIP based model is used, the parameterised action is first converted into a domain dependent action. The output from the policy model is an action comprising a communication function (e.g. "select") and one or more parameter values which describe a slot (e.g. the slot with 5 values and high importance). This is then converted back to a domain dependent summary action, by converting the parameter values back to the original slot (e.g. restaurant). The summary action is then converted to a full action by adding the value corresponding to that slot (e.g. Japanese). For summary actions the value is that with the highest probability in the current belief state. The full summary action (e.g. "select(restaurant=Japanese)") is then used to produce an output.

Alternatively, the policy model may take parameterised inputs, but may output domain dependent actions. For example, a neural network based policy model may operate in the following manner. For each dialogue turn, to select an appropriate action, the policy model iterates over the actions, given the input parameterised belief state. In this case, the ontology information is parameterised in real time by the policy model, and for each action in the inputted set of ontology information, the policy model calculates the DIP features given belief and slot and generates an estimate of the Q value. The Q values are mapped to the domain dependent action however (rather than the parameters). The action (comprising an action function and input (e.g. slot)) that has the highest Q value is then selected.

The output may be in the form of text. The system may comprise a natural language generator (NLG) 406 which converts the text into speech to be output.

The identifier model is configured to, given the current input to the SDS (e.g. belief state, history) output a set of slots that should be active in the current dialogue turn. These are then used to define a sub-domain. The system shown in FIG. 4 uses DIP to train a single dialogue policy that can operate on any sub-domain generated by the model. This allows the system to move between sub-domains and utilize all available knowledge across sub-domains.

Figure 5:
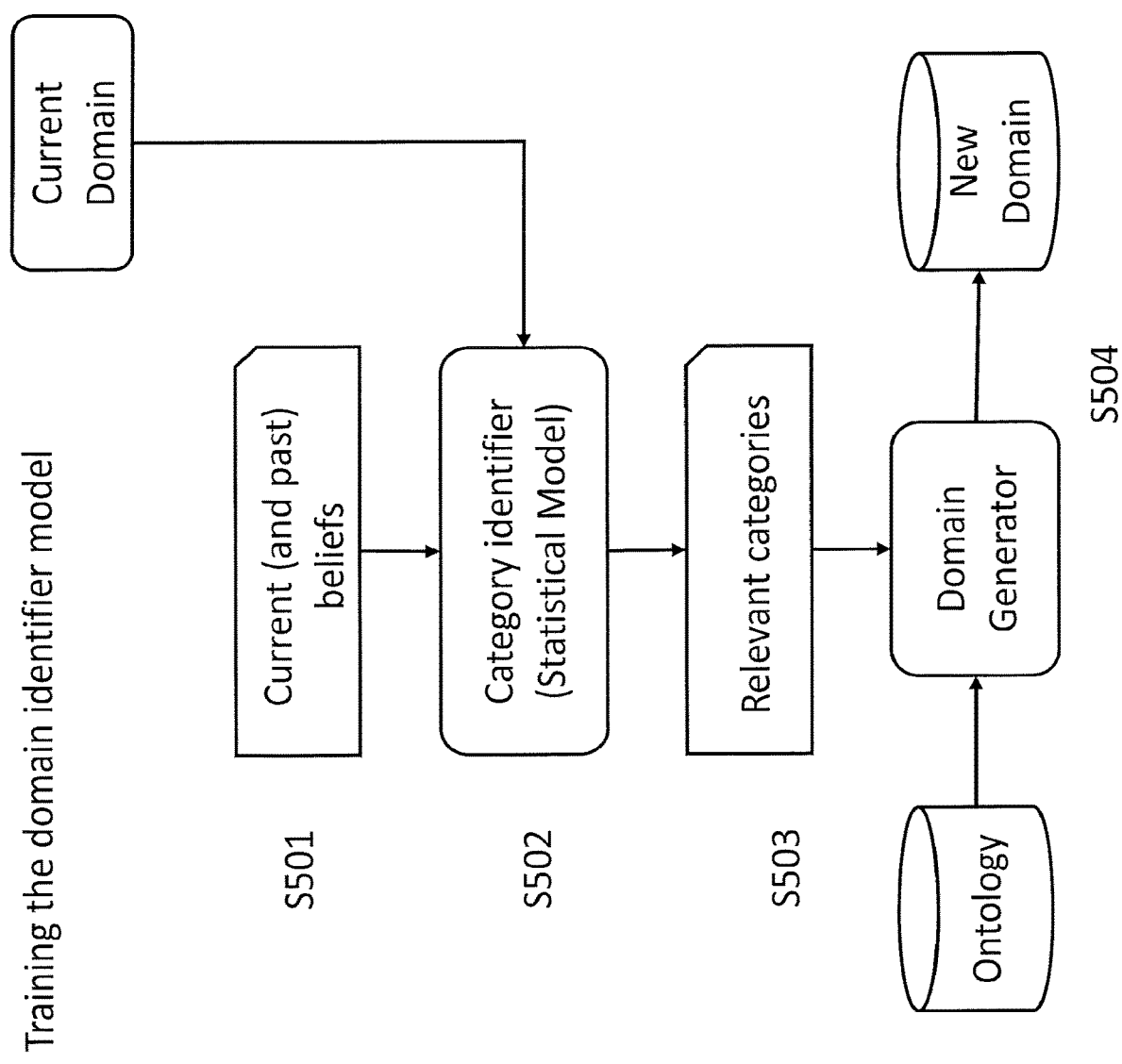
FIG. 5 shows a flow chart of an example method of training an identifier model.

FIG. 5 shows a flow chart of an example method of training an identifier model. In this method, the state tracker model, identifier model and policy model are trained separately.

In S501, system states are obtained for a plurality of dialogues. The system states used in this example are belief states.

A training corpus, comprising a plurality of dialogues is used to train the identifier model. The corpus is a labelled training data corpus for example. The model takes the system state corresponding to each utterance from each dialogue in turn as input.

This corpus may comprise a plurality of system states which correspond to utterances in a dialogue for example.

Alternatively, the corpus may comprise text signals corresponding to utterances in a dialogue, in which case the method of training will comprise a step of extracting the system states from the data. The system states are extracted using a stored, already trained tracker model or tracker models. The tracker model in this example is thus trained prior to the step of training the identifier model, and the trained tracker model then used in training the identifier model. A tracker may be trained for each specific pre-defined domain. Alternatively, a generic belief tracker may be trained. This would then need to be re-trained every time a pre-defined domain is added or removed. An example tracker model that may be used is described in "Word-based dialog state tracking with recurrent neural networks", Henderson, Thomson, Young, SIGDial 2014.

Similarly, if the corpus comprises speech signals, the method of training comprises extracting text signals using a pre-trained spoken language unit and then extracting the system states corresponding to the text signals.

The labels may identify the relevant pre-defined domain for each utterance in the dialogues. However, the model is able to generalise beyond the pre-defined domains that are used in training. The identifier model only sees examples from pre-defined domains, but it can generalise to new domains by learning the correlations between input and relevant slots.

Each system state is input into the statistical model in sequence in S502. Previous system states may also be included in each input to the identifier model as has been described previously in relation to the implementation stage. Similarly, only the value with the highest probability for each category may be included in the input system state, as has been described previously in relation to the implementation stage.

The model then identifies a plurality of relevant categories from the input system state and in S503, the relevant slots are output. A sub-domain is then generated based on these categories in S504. Once the set of relevant slots is identified, the sub-domain generator consults an ontology that describes the available action functions as well as the database of available items, and defines a new sub-domain using the identified relevant slots in S504. "Items" here refers to entities in the database, for example slots, values, specific restaurant names etc. This is done in the same manner as described during the implementation stage. This process is repeated for each dialogue turn.

The labels indicating the current domain are used to determine the success of this identification, allowing the model to learn. The statistical model thus receives the buffer as input and the current pre-defined domain as ground truth and learns to map the beliefs to relevant slots.

Thus data-driven methods are used to train a model that can identify at each dialogue turn which parts of this collective knowledge are relevant for the dialogue to progress.

The policy model is then trained separately from the identifier model. The policy model is trained to map input belief states to output actions. An example method of training of a single policy model which then operates during implementation for the identified sub-domains is described below, where DIP is used. The policy model may be trained with a stored corpus of data, or with a human or simulated user.

Once such a policy has been optimised in one domain using data-driven approaches, the obtained policy (i.e. the learnt model parameters) provides prior knowledge (or mathematically a prior distribution) for the policy in a different domain with a different ontology, providing that the same policy model and same parameterisation are used for the new ontology. Thus the policy model may be trained for a single pre-defined domain for example, but then used in the above described system with a stored ontology comprising information from multiple domains, and where a relevant sub-domain is selected at each dialogue turn. The policy model and identifier model may be trained separately and in parallel for example.

In this case, if a new pre-defined domain is added to the system, the policy model does not need to be re-trained. However, the belief state tracker may need to be re-trained, or an additional trained belief state tracker corresponding to the new pre-defined domain added. The identifier model may also need to be re-trained.

The stored ontology comprising information from multiple domains may be referred to as the end user ontology, which may be an ontology with which the dialogue manager is intended to work. However, the parameterised policy may be optimised using a first ontology, which may correspond to a single pre-defined domain for example.

The first ontology may be different to the end user ontology. The parameterised policy may be optimised for a policy before being used with the end user ontology. The policy may be optimised before it is implemented or deployed with the end user ontology. The parameterised policy uses parameters as inputs and the parameters may be used to define a parameter 'space' where slots of different ontologies may be objectively mapped or compared. As such, a policy optimised for a first ontology may also thereby be optimised for an end user ontology. The end-user ontology may be either the global ontology, comprising multiple pre-defined domains or any single pre-defined domain ontology. Optionally, the identifier can be used to identify the relevant slots and define the domain used as the end-user ontology at each turn.

To optimise the policy for a first ontology, a slot of the first ontology may be defined in terms of at least one of the ontology-independent parameters such that it is suitable for being used as an input to the parameterised policy. Each of the slots of the first ontology may be defined in terms of at least one of the ontology-independent parameters. This may be done in the same manner as described above in relation to the implementation. As described above, some of the parameters for the ontology information may be stored. Some or all of the parameters may be generated for each dialogue turn.

The optimisation process may comprise repeatedly using a policy model to run through a dialogue with a human or a simulated human. In combination with, or in response to the dialogues with a real or simulated human, the policy may be adapted to increase a performance indicator as described above. Dialogue policy optimisation may be aimed at estimating the expected long-term reward for a system action being executed at a system state or belief state, such that the action with maximum expected reward can be selected at each dialogue turn. The policy model may be a deep neural network based policy model for example.

The dialogues may comprise text signals, in which case the method of training will comprise a step of extracting the system states from the data. The system states are extracted using a stored, already trained tracker model or tracker models. The tracker model in this example is thus trained prior to the step of training the policy model, and the trained tracker model then used in training the policy model. Similarly, if the data comprises speech signals, the method of training comprises extracting text signals using a pre-trained spoken language unit and then extracting the system states corresponding to the text signals.

Each extracted system state is then inputted into the statistical model. Previous system states may also be included in each input to the identifier model as has been described previously in relation to the implementation stage. Similarly, only the value with the highest probability for each category may be included in the input system state, as has been described previously in relation to the implementation stage.

Each input system state is defined in terms of at least one of the ontology-independent parameters such that it is suitable for being used as an input to the parameterised policy. Each of the slots of the first ontology may be defined in terms of at least one of the ontology-independent parameters. This may be done in the same manner as described above in relation to the implementation.

Optimising a policy may comprise maximising a certain performance indicator for a specific domain and ontology, or increasing a performance indicator over an initial value. Optimisation of a policy may comprise adapting the policy to increase the success rate or the average reward. Optimisation may comprise adapting a policy such that the mean average, or a combination of the above indicators is maximised. The optimisation process may be a function approximation procedure.

As has been described above, actions in an SDS system may comprise two parts, a communication function a (e.g. inform, deny, confirm, etc.) and (optionally) a list of slot-value pairs s, v (e.g. food=Chinese, pricerange=expensive, etc.). Dialogue policy optimisation can be solved via Reinforcement Learning (RL), where the goal during learning is to estimate a quantity $Q(b, a)$, for each b and a, reflecting the expected cumulative rewards of the system executing action a at belief state b. A reward function assigns a reward r given the current state and action taken. The reward function can assign a reward r given the current state and action at each turn in the dialogue. Alternatively, this may be done by determining a reward value R at the end of each dialogue (e.g. from human input) and then determining a reward r for each turn of the dialogue (i.e. corresponding to a state and action taken at that turn) from this final value R for the dialogue. Q estimates the expected value of future rewards (accumulated r), given state b and action a. The value of Q may be updated based on the r values using a Q learning update rule.

A function approximation may be used, where it is assumed that $$Q(b,a) \approx f_\theta(b,a))$$

where θ is the model parameter to learn, and φ(·) is a parameter function that maps (b, a) to a parameter vector. f is a function with parameters θ. For example, f(φ(b,a))=θ* (φ(b,a))+z, where θ and z are parameters to optimise so that f(φ(b,a))=Q(b,a). More generally, f is the function that multiplies φ(·) with the weights θ.

During learning, Q is estimated for each b and a combination. Parameters used to generate the Q values are learned and stored. During implementation, the Q values for an input system state are generated from these parameters. During learning and implementation, the action a which has the highest Q for the input state b is selected. The parameters may continue to be updated during implementation.

To compute Q (b, a), one can either use a summary belief for dimension reduction or apply the full belief if kernel methods are used. In both cases, the action a may be a summary action to achieve tractable computations. Summary actions have been described above and simplify the semantic representations that form the master action a, and can be mapped back to the master action based on some pre-defined rules. The summary actions may comprise an action function and an action function input which may be null or a single category for example.

The master action a can thus be re-written as $a_s$, where s denotes the slot that a depends on when summarised. Here, s is fully derived from a and can be null (when the summary action of a is just a). The following form of φ can then be used:

$$\phi(b,a_s) \triangleq \delta(a_s) \otimes \psi(b)$$

where δ is the Kronecker delta, ψ(·) is a function which parameterises the belief state, and has been described above, and ⊗ is the tensor product. Without losing generality, one can assume that the communication functions a are domain-independent. However, since the slots s are domain-specific (defined by the ontology), both $a_s$ and b will be domain-dependent.

Making ψ(b) domain-independent has been described above, where b comprises a set of individual belief vectors, represented as $\{b_{joint}, b_0\} \cup \{b_s\}_{s \in S}$ where $b_o$ denote the sections of the belief state independent of any slots (e.g. the belief over the communication methods, the dialogue history, etc.) and S stands for the set of (informable) slots defined in the domain ontology. It is possible to construct a parameter function $$\psi(b,s) \triangleq \psi_1(b_{joint}) \oplus \psi_2(b_o) \oplus \psi_3(b_s)$$

and let $$\phi(b,a_s) \triangleq \delta(a_s) \otimes \psi(b,s)$$

where ⊕ stands for the operator to concatenate two vectors. After this, as the mechanism in each $\psi_x$ to parameterise its operand $b_x$ can be domain-independent, the resulting overall parameter vector will be domain-general. Example functions ψ(b, s) for parameterising the belief state have been described above.

The summary action $a_s$ is now the only domain-dependent element. Each slot s can be parameterised in a domain-general way, by defining $$\phi(b,a_s) \triangleq \delta(a) \otimes [\varphi_a(s) \oplus \psi_a(b,s)]$$

and the domain dependent of the overall parameter function φ will be eliminated. Optionally the parameter functions $\varphi_a$ and $\psi_a$ may change with a, such that a different parameterisation can be applied for each a. $\psi_a$ parameterises the ontology information and has been described above.

Thus each slot in the stored ontology is parameterised using $\varphi_a$ and each slot in the belief state is parameterised using $\psi_a$ before being input into the model. Example functions $\varphi_a$ and $\psi_a$ for parameterising the stored ontology information and the system states have been described above.

Policy learning, i.e. optimisation of a policy is to assign a parameter $\theta_a$ (e.g. a weight vector if linear model is the case) for each action a. In this specific discussion a is used to denote a full action, and a(s) denotes a summary action that is uniquely derived from a, where a is the action type (which is formally called a communication function, e.g. 'inform', 'request', 'confirm', etc.) and s is the slot that a depends on (it can be null if a doesn't have any slot-value argument, or a depends on the joint belief, hence doesn't depend on any specific slot). Once the weights have been learned, the same parameterisation functions $\varphi_a$ and $\psi_a$ are used to parameterize the ontology and the belief states respectively during implementation.

For a case in which DIP is not used, a separate $\theta_{a,s}$ is learned and stored for each valid combination of (a,s). But in the case where DIP is used, as the slots s are parameterised as the input of the policy model, it is only needed to learn and store a policy model parameter (weight) $\theta_a$ for each communication function. In other words, all the a(s) that have the same a but different s will share the same policy model parameter (weight) $\theta_a$. As such, the output of the policy optimisation technique using DIP has a different data structure (fewer number model parameters).

During optimisation, the policy model may interact with a human or simulated user, and receive feedback which allows determination of the weights $\theta_a$. The interactions may comprise dialogues relating to a single pre-defined domain for example or multiple pre-defined domains. A system state tracker maps the input utterances to system states, which are then converted to ontology independent parameters using the function ψ(b,s). The stored ontology, comprising action functions and slots is also converted to ontology independent parameters using the function $\varphi_a(s)$. These are used to generate summary actions, which together with the system state are input into the policy model for each utterance, which in turn outputs a summary action, comprising a communication function and one or more ontology independent parameter values defining a slot. The ontology independent parameter values are then mapped back to the original slot, which is combined with the communication function to form an output summary action, which may then be converted to a full action by adding the top value in the belief state for the slot. Alternatively, the policy model may take parameterised inputs, but may output domain dependent actions as described above. The feedback regarding the success of the dialogue is used to update the weights $\theta_a$ associated with the summary actions.

Figure 6:
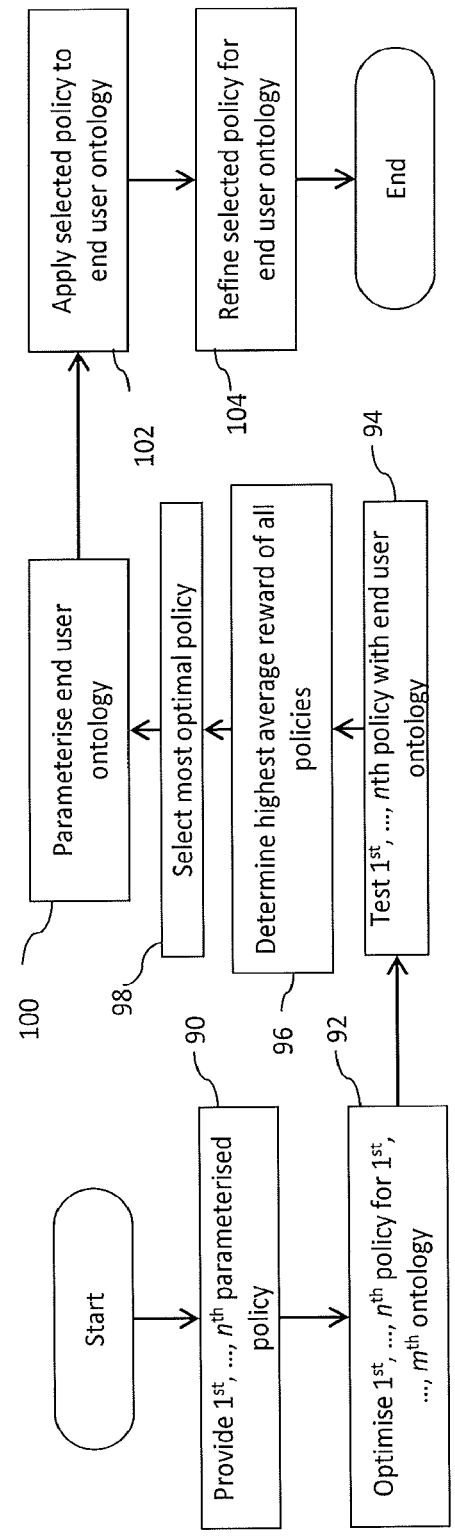
FIG. 6 shows an example method for training a policy model.

FIG. 6 shows an example method for optimising a parameterised policy for a specific ontology to increase at least one of the success rate or average reward over a value for an unadapted policy. An unadapted policy is one that has not been optimised (i.e. has not been through an optimisation procedure). Alternatively, the policy may be optimised such that the action with maximum expected reward can be selected at each dialogue turn, an action being a choice made by a dialogue manager as to what to do at a certain point. The adaptation is usually done in response to and combination with repetitive use of the policy either with a human user or a computer simulating a human user. The method described in relation to FIG. 6 uses Gaussian Process Temporal Difference (GPTD) learning to optimise the parameterised policy, also known as GP-SARSA.

The parameterised policy of FIG. 6 is optimised for a specific ontology as described above. This ontology is not necessarily the ontology with which the policy will eventually be used.

In order for the ontology with which the policy is to optimised to be used with the ontology-independent policy, each slot of the ontology is defined in terms of ontology-independent parameters as described above. This may be done at each dialogue turn, or some of the parameters may be generated initially and stored for use during training. Once the slots have been defined in terms of ontology-independent parameters, the ontology can be used with the policy in order to optimise the policy.

n different parameterised policies are provided initially in step 90. The parameterised policies are configured to receive ontology-independent parameters as inputs. The parameterised policies at this stage have not been optimised.

Each of the parameterised policies (1 to n) are then optimised in step 92. The policies may be optimised using GP-SARSA for example. The policies may all be optimised by, or with respect to, the same domain with the same ontology, or by different domains with different ontologies. As the policies are domain-independent, it does not matter if the ontology with which the policy is to be used (the "end user" ontology) is different from that for which it was optimised. In order to be used to optimise the ontology-independent policies, each of the m ontologies must have each of their slots defined in terms of ontology-independent parameters before the optimisation can be undertaken. The parameters may be those discussed above.

Once each ontology is suitable for use with the respective policy it is to optimise, each of the optimised policies is used with the end user ontology 94 (the ontology with which the policy is eventually to be implemented). The 'most optimal' policy for the end user ontology is then determined 96. For example, the most optimal policy here is that with the highest average reward. Alternatively, the most optimal policy may be that with the highest task success rate, or average of the two values. The most optimal policy is then selected 98 to be used with the end user ontology. The end-user ontology may be either the global ontology, comprising multiple pre-defined domains or any single pre-defined domain ontology. Optionally, the identifier can be used to identify the relevant slots and define the domain used as the end-user ontology at each turn.

In order to use the parameterised policy with the end user ontology, the end user ontology is parameterised 100. This can be done as described above, for each turn, or initially. Once the end user ontology has been parameterised, the policy is applied to the end user ontology 102. Optionally, the policy applied to the end user ontology is then refined in 104. The process for refining the selected policy in FIG. 6 is the same process as that used to optimise the policy. Naturally, in order to refine the selected policy it is repetitively used with the end user ontology, rather than a further, unrelated ontology. As the policy applied to the end user ontology has already been optimised, the policy at the start of the refining process 104 is an optimised policy. As such, a comparatively small amount of adaptation is required when compared to that for the optimisation process.

Figure 7:
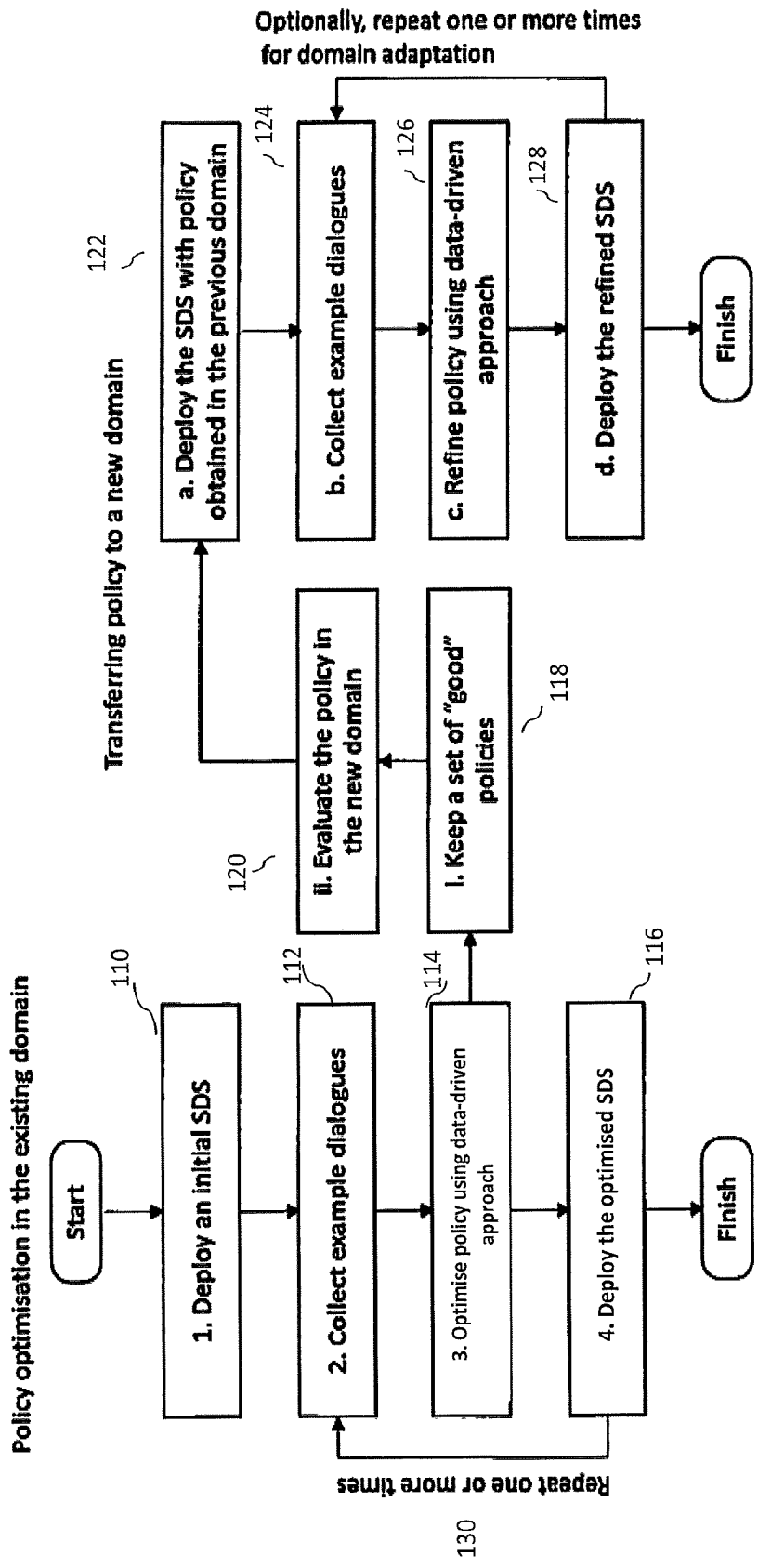
FIG. 7 schematically illustrates a further method for training a policy model in a first domain with a first ontology and transferring the policy to an end user domain with an end user ontology.

FIG. 7 schematically illustrates a further method for optimising a policy in a first domain with a first ontology and transferring the policy to an end user domain with an end user ontology. An initial SDS is deployed 110 with an ontology-independent policy. This policy is deployed in a first domain with a first ontology. The slots of the first ontology have been defined in ontology-independent parameters so they can be used with the policy. Example dialogues are collected 112 and the policy is optimised 114 as discussed above. The optimised policy can then be deployed 116 as part of an SDS in the domain with the first ontology. Once deployed, an iteration loop 130 may collect further example dialogues 112 to optimise the policy further 114.

Once the policy has been optimised, it may be kept as part of a set of "good" policy or policies 118. The good policy or policies can then be implemented in a new domain with an end user ontology and their performance evaluated 120. If there are multiple "good" policies, the most optimal for the end user ontology can be selected. The selected policy, or the only "good" policy is then deployed with the end user ontology 122. Optionally, further example dialogues may be collected in 124 and the policy further refined in 126 using a data driven approach.

The refined SDS is then deployed in 128.

In general, dialogue policy optimisation is aimed to estimate the expected long-term reward for a system action a being executed at a system state (in MDP-SDS) or a belief state (in POMDP-SDS), such that the action with maximum expected reward can selected at each dialogue turn.

Once the policy model has been trained, it can be implemented in an SDS with the trained state tracker model, identifier model, and any other further models needed, for example text to speech models, automatic speech recognition models, natural language generation models etc.

Since the policy model operates on a smaller sub-domain, i.e. the input system state comprises only the relevant categories and only the applicable actions are considered, the policy operation is training is efficient and there is no need to track the topic of the dialogue.

The above description relates to a method of training the various models separately. However, it is also possible to train the identifier model together with one or more of the other models. For example, the identifier model may be trained together with the policy model. In this case, instead of using labelled data to train the identifier model, some kind of feedback as described above in relation to the policy model may also be used to train the identifier model.

Optionally, this is done by using connected DNNs and jointly optimising the identifier model and the policy model. In this case, the identifier model and the policy model are connected DNNs, or may be one large DNN. The system state tracker model may also be trained together with the identifier model and policy model. Training these models may comprise adapting the models to increase the success rate or the average reward, for example it may comprise adapting the models such that the mean average, or a combination of the above indicators is maximised.

The identifier and policy model are trained on the same input speech at the same time, and the policy model's input depends on the identifier's output.

The models receive feedback about the quality of the dialogue, and use it to assess the selection of system states, relevant slots and actions. Over time, the models learn to make good predictions, that lead to better feedback/quality measures.

The identifier model is thus trained with a DNN policy model. The method of training comprises jointly train both models, where instead of having a ground truth for the identifier, an overall measure of dialogue success is used to measure how good the slot selection was.

Figure 8:
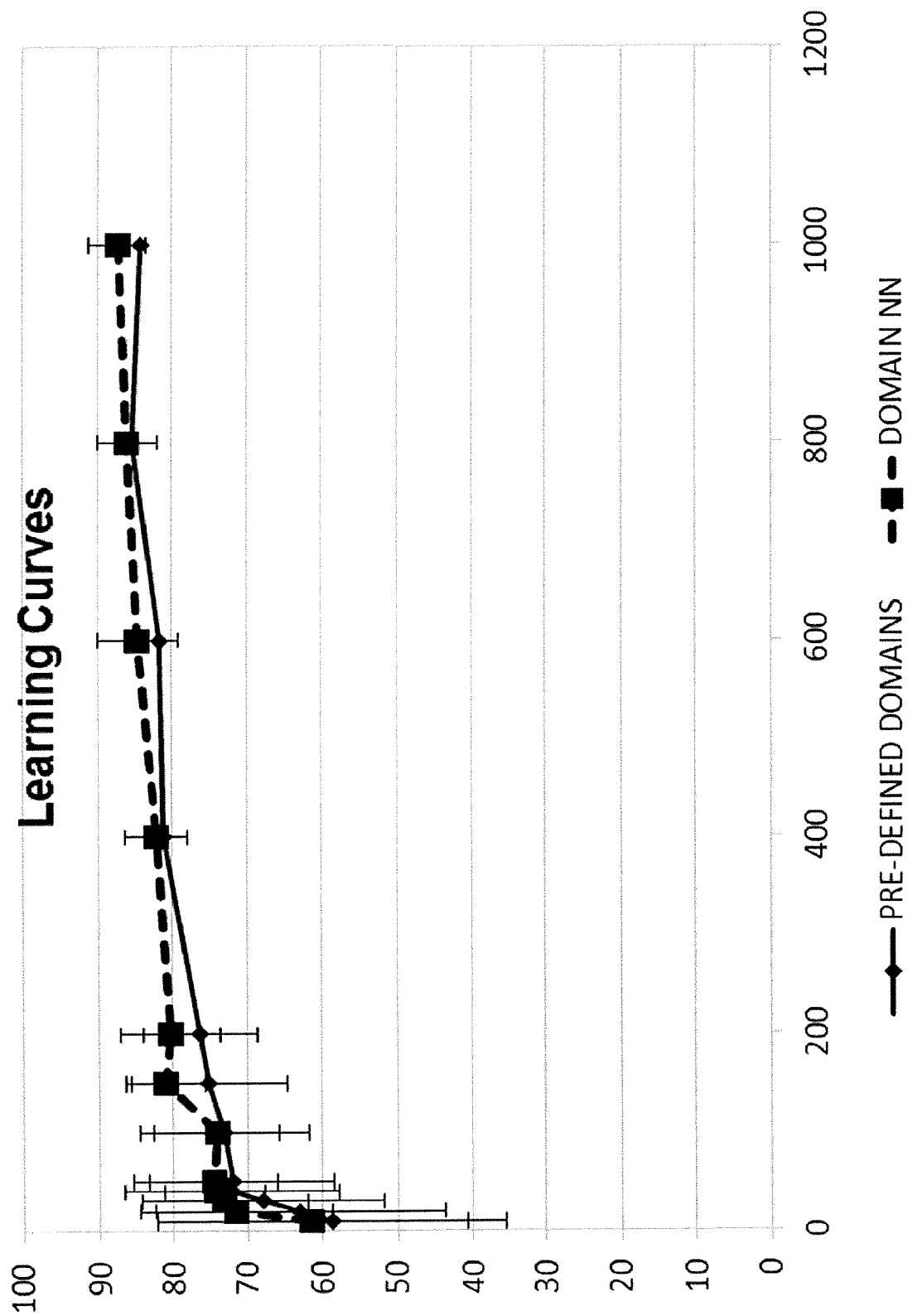
FIG. 8 shows learning curves showing dialogue success rates achieved by using pre-defined domains and using the method described in relation to FIG. 3 using continuous sub-domains.

FIG. 8 shows learning curves showing dialogue success rates achieved by using pre-defined domains (solid line) and the method described in relation to FIG. 4 using continuous sub-domains (dashed line). Two domains were used: Toshiba Laptops and Toshiba External Hard Drives. There were 9 slots: 'discourseAct', 'batteryrating', 'driverange', 'family', 'isforbusinesscomputing', 'pricerange', 'weightrange', 'capacity', 'kind', and 9 action functions: 'hello', 'bye', 'inform', 'confirm', 'select', 'request', 'reqmore', 'repeat', 'restart'.

The above described methods enable transition between sub-domains and exchange of relevant dialogue state information, and therefore the development time and effort needed to deploy a system as a multi-domain SDS, as well as time and effort needed to maintain and extend it, is low.

The system states and the domain-specific ontologies may be represented as slot-value pairs, which may be used for representation for task-oriented spoken dialogue systems for example.

The above described systems and methods generate operating sub-domains in real time, for spoken dialogue systems. The systems are configured to automatically identify features of an ontology that are relevant to the current dialogue turn. The system creates sub-domains in real-time, enabling it to respond to the user. When switching between sub-domains, relevant dialogue state information can be shared, leading to efficient training of dialogue policies.

While certain arrangements have been described, these arrangements have been presented by way of example only, and are not intended to limit the scope of the inventions. Indeed the methods and systems described herein may be embodied in a variety of other forms; furthermore, various omissions, substitutions and changes in the form of methods and apparatus described herein may be made.

The invention claimed is:

1. A dialogue system comprising:
an input for receiving data relating to a speech or text signal originating from a user;
an output for outputting information specified by an action; and
a processor configured to:
i) update a system state based on the input data using a state tracker model, wherein the system state comprises probability values associated with each of a plurality of possible values for each of a plurality of categories, wherein a category corresponds to a subject that the speech or text signal may relate to and can take on one or more values from a set of values;
ii) identify one or more relevant categories based on at least part of the updated system state information using an identifier model;
iii) define a set of information from stored information, the stored information comprising a plurality of action functions and categories, the set of information excluding categories which were not identified as relevant;
iv) generate a reduced system state comprising the probability values associated with one or more of the plurality of possible values for each of the relevant categories;
v) determine an action based on the reduced system state and the set of information using a policy model; and vi) output information specified by the determined action at the output, wherein the action comprises an action function combined with a relevant category or an action function,
wherein the stored information and the plurality of categories are from a plurality of different pre-defined domain-specific ontologies, wherein a pre-defined domain corresponds to a particular dialogue topic and wherein the pre-defined domain-specific ontology comprises the plurality of categories and actions relating to the particular dialogue topic, and wherein the relevant categories comprise categories from different pre-defined domain-specific ontologies and the set of information comprises actions from different pre-defined domain-specific ontologies.

2. The dialogue system according to claim 1, wherein the policy model is configured to operate with ontology-independent parameters as input and step iv) further comprises: parameterizing the reduced system state in terms of a first set of one or more ontology independent parameters.

3. The dialogue system according to claim 2, wherein step iii) further comprises: parameterizing the set of information in terms of a second set of one or more ontology independent parameters.

4. The dialogue system according to claim 1, wherein the output is an output for outputting a speech signal and wherein step vi) comprises:
generating text based on the action; and
converting the text to speech and outputting the speech signal at the output.

5. The dialogue system according to claim 1, wherein the input is for receiving a speech signal and wherein step i) further comprises: generating an automatic speech recognition hypothesis with associated probability from the input speech signal.

6. The dialogue system according to claim 1, wherein step ii) comprises inputting the at least part of the updated system state information into the identifier model, which obtains a probability that each category is relevant based on the updated system state and identifies the relevant categories as those with probabilities higher than a threshold value.

7. The dialogue system according to claim 6, wherein the inputted system state information comprises the possible value corresponding to the highest probability for each category from the updated system state and the corresponding probability and does not include the other possible values and corresponding probabilities.

8. The dialogue system according to claim 6, wherein the updated system states for each new input signal in a dialogue are stored for a period of time, and wherein step comprises inputting the at least part of the updated system state information from one or more previous input signals into the identifier model.

9. The dialogue system according to claim 1, wherein the categories are slots.

10. The dialogue system according to claim 1, wherein i) comprises updating a plurality of system states based on the input data using a plurality of state tracker models, wherein each system state comprises probability values associated with each of a plurality of possible values for each of a plurality of categories associated with a pre-defined domain.

11. A dialogue method comprising:
receiving, in an input, data relating to a speech or text signal originating from a user;
updating, in a processor, a system state based on the input data using a state tracker model, wherein the system state comprises probability values associated with each of a plurality of possible values for each of a plurality of categories, wherein a category corresponds to a subject that the speech or text signal may relate to and can take on one or more values from a set of values;
identifying, in the processor, one or more relevant categories based on at least part of the updated system state information using an identifier model;
defining, in the processor, a set of information from stored information, the stored information comprising a plurality of action functions and categories, the set of information excluding categories which were not identified as relevant;
generating, in the processor, a reduced system state, comprising the probability values associated with one or more of the plurality of possible values for each of the relevant categories;
determining, in the processor, an action based on the reduced system state and the set of information using a policy model; and
outputting, in an output, information specified by the determined action at the output, wherein the action comprises an action function combined with a relevant category or an action function,
wherein the stored information and the plurality of categories are from a plurality of different pre-defined domain-specific ontologies, wherein a pre-defined domain corresponds to a particular dialogue topic and wherein the pre-defined domain-specific ontology comprises the plurality of categories and actions relating to the particular dialogue topic, and wherein the relevant categories comprise categories from different pre-defined domain-specific ontologies and the set of information comprises actions from different pre-defined domain-specific ontologies.

12. A method of adapting a dialogue system, the method comprising:
obtaining, in a processor, system states for a plurality of dialogues, each system state based on a speech or text signal in a dialogue, wherein the system state comprises probability values associated with each of a plurality of possible values for each of a plurality of categories, wherein a category corresponds to a subject that the speech or text signal may relate to and can take on one or more values from a set of values; and
training, in the processor, an identifier model to identify one or more relevant categories based on at least part of an input system state information, wherein
the identifier model and a policy model are trained together by using the identifier model and the policy model to run through dialogues with a human or a simulated human and providing a performance indicator for each dialogue, and
the method further comprises:
receiving, in an input, data relating to a speech or text signal in a dialogue, wherein obtaining a system state comprises updating a system state based on the input data using a state tracker model,
identifying, in the processor, one or more relevant categories based on at least part of the updated system state information using the identifier model;
defining, in the processor, a set of information from stored information, the stored information comprising a plurality of action functions and categories, the set of information excluding categories which were not identified as relevant;
generating, in the processor, a reduced system state, comprising the probability values associated with one or more of the plurality of possible values for each of the relevant categories;
determining, in the processor, an action based on the reduced system state and the set of information using a policy model;
outputting, in an output, information specified by the determined action at the output; and
adapting the policy model and the identifier model to increase the performance indicator.

13. The method according to claim 12, wherein the system states are obtained from a corpus of data and the training is performed using labels associated with the data which indicate a pre-defined domain corresponding to each utterance.

14. The method according to claim 12, wherein the identifier model, the state tracker model and the policy model are trained together and wherein the method further comprises: adapting the state tracker model to increase the performance indicator.

15. The method according to claim 12, further comprising training a policy model by running through dialogues with a human or a simulated human and providing a performance indicator for each dialogue, wherein each dialogue comprises a sequence of text or speech signals and wherein the method further comprises:
receiving data relating to a speech or text signal in a dialogue;
updating a system state based on the input data using a state tracker model, wherein the system state comprises probability values associated with each of a plurality of possible values for each of a plurality of categories, wherein a category corresponds to a subject that the speech or text signal may relate to and can take on one or more values from a set of values;
parameterizing the system state in terms of a first set of one or more ontology independent parameters;
determining an action based on the parameter values for the system state and stored ontology information, wherein the stored ontology information is parameterized in terms of a second set of one or more ontology independent parameters;
outputting information specified by the determined action at the output;
adapting the policy model to increase the performance indicator; and
for each category present in the dialogues, determining a cumulative moving average of the ratio of the performance indicator achieved to the maximum possible performance indicator as an estimate of category importance, wherein the importance is used as one of the second set of parameters.

16. The method according to claim 12, further comprising training a policy model by running through dialogues with a human or a simulated human and providing a performance indicator for each dialogue, wherein each dialogue comprises a sequence of text or speech signals and wherein the method further comprises:
receiving data relating to a speech or text signal in a dialogue;
updating a system state based on the input data using a state tracker model, wherein the system state comprises probability values associated with each of a plurality of possible values for each of a plurality of categories, wherein a category corresponds to a subject that the speech or text signal may relate to and can take on one or more values from a set of values;

parameterizing the system state in terms of a first set of one or more ontology independent parameters;

determining an action based on the parameter values for the system state and stored ontology information, wherein the stored ontology information is parameterized in terms of a second set of one or more ontology independent parameters;

outputting information specified by the determined action at the output;

adapting the policy model to increase the performance indicator; and for each category in the dialogues, determining a cumulative moving average of the relative position in the dialogue as an estimate of category priority, wherein the priority is used as one of the second set of parameters.

17. A non-transitory carrier medium comprising computer readable code that, when executed by a computer, causes the computer to perform:

receiving data relating to a speech or text signal originating from a user;

updating a system state based on the input data using a state tracker model, wherein the system state comprises probability values associated with each of a plurality of possible values for each of a plurality of categories, wherein a category corresponds to a subject that the speech or text signal may relate to and can take on one or more values from a set of values;

identifying one or more relevant categories based on at least part of the updated system state information using an identifier model;

defining a set of information from stored information, the stored information comprising a plurality of action functions and categories, the set of information excluding categories which were not identified as relevant;

generating a reduced system state, comprising the probability values associated with one or more of the plurality of possible values for each of the relevant categories;

determining an action based on the reduced system state and the set of information using a policy model; and outputting information specified by the determined action at the output, wherein the action comprises: an action function combined with a relevant category; or an action function, wherein the stored information and the plurality of categories are from a plurality of different pre-defined domain-specific ontologies, wherein a pre-defined domain corresponds to a particular dialogue topic and wherein the pre-defined domain-specific ontology comprises the plurality of categories and actions relating to the particular dialogue topic, and wherein the relevant categories comprise categories from different pre-defined domain-specific ontologies and the set of information comprises actions from different pre-defined domain-specific ontologies.

* * * * *